(12) United States Patent
    Kawano et al.

(10) Patent No.: US 11,107,469 B2
(45) Date of Patent: Aug. 31, 2021

(54) INFORMATION PROCESSING APPARATUS AND INFORMATION PROCESSING METHOD

(71) Applicant: SONY CORPORATION, Tokyo (JP)

(72) Inventors: Shinichi Kawano, Tokyo (JP); Yuhei Taki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 111 days.

(21) Appl. No.: 16/463,776

(22) PCT Filed: Jan. 4, 2018

(86) PCT No.: PCT/JP2018/000014
    § 371 (c)(1),
    (2) Date: May 23, 2019

(87) PCT Pub. No.: WO2018/135302
    PCT Pub. Date: Jul. 26, 2018

(65) Prior Publication Data
    US 2019/0378507 A1    Dec. 12, 2019

(30) Foreign Application Priority Data

Jan. 18, 2017 (JP) .............................. JP2017-007121

(51) Int. Cl.
    *G10L 15/22*    (2006.01)
    *G10L 15/26*    (2006.01)
    (Continued)

(52) U.S. Cl.
    CPC .............. *G10L 15/22* (2013.01); *G06F 3/167* (2013.01); *G10L 15/26* (2013.01); *G10L 15/30* (2013.01); *G10L 2015/223* (2013.01)

(58) Field of Classification Search
    CPC .............. G10L 15/22; G10L 2015/223; G10L 2015/225; G10L 15/26; G10L 15/30;
    (Continued)

(56) References Cited

U.S. PATENT DOCUMENTS

2008/0059175 A1* 3/2008 Miyajima ............... G10L 15/00
                                                        704/246
2013/0080177 A1    3/2013 Chen
2016/0091967 A1    3/2016 Prokofieva et al.

FOREIGN PATENT DOCUMENTS

CN    101136198 A    3/2008
CN    103035240 A    4/2013
(Continued)

OTHER PUBLICATIONS

International Search Report and Written Opinion of PCT Application No. PCT/JP2018/000014, dated Feb. 27, 2018, 10 pages of ISRWO.

*Primary Examiner* — Leshui Zhang
(74) *Attorney, Agent, or Firm* — Chip Law Group

(57) ABSTRACT

The present disclosure relates to an information processing apparatus and an information processing method for enabling provision of a more convenient speech recognition service. The information processing apparatus includes a speech recognition unit that performs speech recognition for speech information based on an utterance of a user, and a correction portion estimation unit that collates content of a sentence obtained as a speech recognition result with collation information necessary for determining accuracy of the content to estimate, for the sentence, a correction portion that requires correction. The sentence obtained as a speech recognition result is displayed together with the correction portion estimated by the correction portion estimation unit and presented to the user.

8 Claims, 22 Drawing Sheets

(51) Int. Cl.
*G10L 15/30* (2013.01)
*G10L 15/24* (2013.01)
*G06F 3/16* (2006.01)

(58) Field of Classification Search
CPC ......... G10L 15/00; G10L 15/01; G10L 15/02; G10L 15/10; G10L 15/32; G10L 15/20; G10L 21/00; G10L 21/028; G10L 2015/221; G10L 2015/227; G06F 3/167; G06F 3/16
USPC .............. 704/235, 233, 246–250, 270.1, 272
See application file for complete search history.

(56) References Cited

FOREIGN PATENT DOCUMENTS

| | | | | |
|---|---|---|---|---|
| CN | 107077201 A | | 8/2017 | |
| EP | 1895510 A1 | | 3/2008 | |
| EP | 2587478 A2 | | 5/2013 | |
| EP | 3198328 A1 | | 8/2017 | |
| JP | 2003-108551 A | | 4/2003 | |
| JP | 2008-058409 A | | 3/2008 | |
| JP | 2009-223171 A | | 10/2009 | |
| JP | 2011-002656 A | | 1/2011 | |
| JP | 2011002656 A | * | 1/2011 | ............. G10L 15/00 |
| JP | 2012-128188 A | | 7/2012 | |
| JP | 2012128188 A | * | 7/2012 | ............. G10L 15/18 |
| JP | 2013-073240 A | | 4/2013 | |
| KR | 10-2013-0034630 A | | 4/2013 | |
| KR | 10-2017-0065563 A | | 6/2017 | |
| WO | 2016/049439 A1 | | 3/2016 | |

* cited by examiner

FIG. 4

USER UTTERANCE  I WENT TO EBISU DURING THE DAY AND SHOPPED IN IKEBUKURO UNTIL 17 O'CLOCK TODAY

SPEECH RECOGNITION RESULT

I WENT TO EBISU DURING THE DAY AND SHOPPED IN IKEBUKURO UNTIL 17 O'CLOCK TODAY

ACTION INFORMATION

| ACTION ON yyyy/mm/dd | PLACE (STATION) WHERE USER WAS BEFORE |
|---|---|
| ... | ... |
| 12:00 | SHINAGAWA |
| 13:00 | EBISU |
| 17:00 | SHINJUKU |
| 21:00 | MEGURO |
| ... | ... |

USER INTERFACE

 I WENT TO EBISU DURING THE DAY AND SHOPPED IN IKEBUKURO UNTIL 17 O'CLOCK TODAY

IS THIS CORRECT?
YES (CORRECT)    NO (INCORRECT)

FIG. 5

USER UTTERANCE: I WENT TO EBISU DURING THE DAY AND SHOPPED AT XYZ SHOP AT 17 O'CLOCK TODAY

SPEECH RECOGNITION RESULT: I WENT TO EBISU DURING THE DAY AND SHOPPED AT XYZ SHOP AT 17 O'CLOCK TODAY

ACTION INFORMATION

| ACTION ON yyyy/mm/dd | PLACE (STATION) WHERE USER WAS BEFORE |
|---|---|
| ... | ... |
| 12:00 | SHINAGAWA |
| 13:00 | EBISU |
| 17:00 | SHINJUKU |
| 21:00 | MEGURO |
| ... | ... |

USER INTERFACE

 I WENT TO EBISU DURING THE DAY AND SHOPPED AT XYZ SHOP AT 17 O'CLOCK TODAY

HERE IS "SHINJUKU" IN RECORD. IS THIS (XYZ SHOP) CORRECT?

YES (CORRECT) | NO CORRECTED TO (SHINJUKU)

FIG. 7
USER UTTERANCE  TODAY WAS SUNNY
⇩
SPEECH RECOGNITION RESULT
TODAY WAS STORMY
⇩
WEATHER INFORMATION
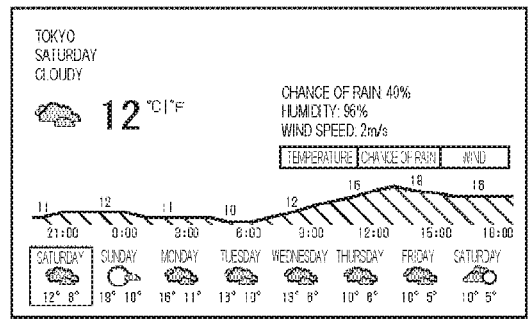
⇩
USER INTERFACE
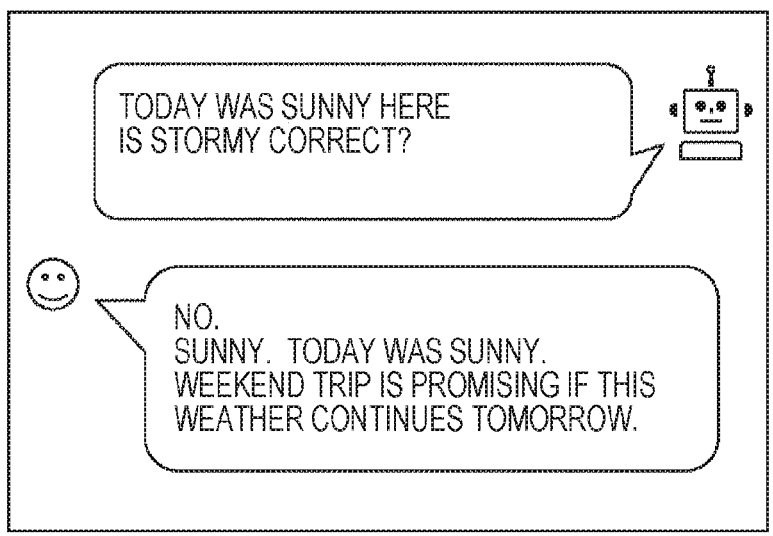

FIG. 10
USER UTTERANCE
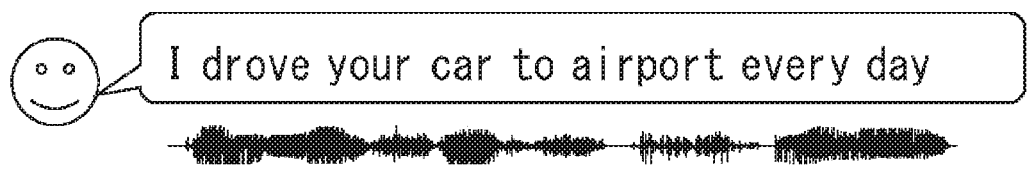
SPEECH RECOGNITION RESULT
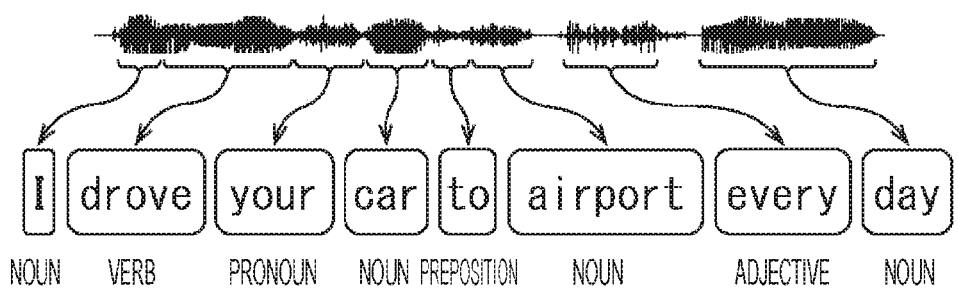
USER INTERFACE
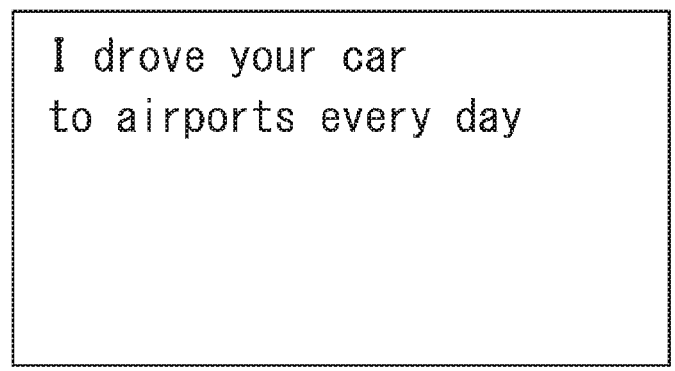

FIG. 12
USER INTERFACE
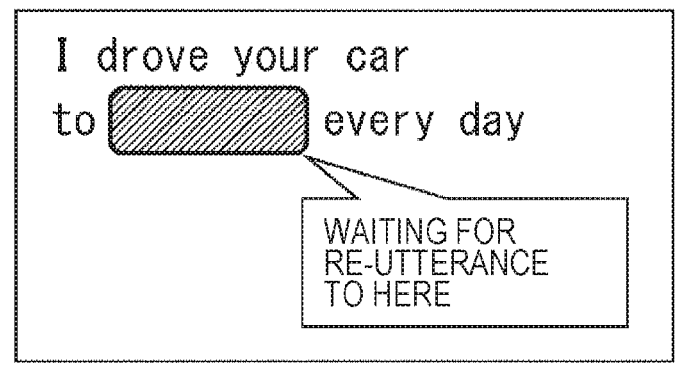
USER UTTERANCE
SPEECH INFORMATION
OF RE-UTTERANCE
SPEECH INFORMATION
OF RE-UTTERANCE
SPEECH RECOGNITION RESULT
I drove your car to station every day

*FIG. 16*

| NOUN | CATEGORY |
|---|---|
| ... | ... |
| APPLE | FRUIT NAME |
| ORANGE | FRUIT NAME |
| ... | ... |
| STATION | FACILITY NAME |
| ... | ... |

| CATEGORY | ATTACHABLE INFORMATION | FORMAT |
|---|---|---|
| ... | ... | ... |
| FRUIT NAME | SWEET | ① [TASTY FRUIT] +"IS"+(TARGET CHARACTERS) |
| | | ② (TARGET CHARACTERS) +"IS VERY GOOD FOR YOUR BODY" |
| | | ... |
| FACILITY NAME | BEAUTIFUL | ① "I CAME TO"+(TARGET CHARACTERS) +"THAT IS POPULAR SPOT FOR YOUNG PEOPLE" |
| | | ... |

*FIG. 18*

- SHUFFLE WORDS

UTTERANCE: I drove your car to airport every day
    RECOGNITION: I drove your car to airport every day
    RE-UTTERANCE: station

- CONJUGATION OF VERB, CHANGE OF NOUN

UTTERANCE: I liked your car
    RECOGNITION: I like your car
    RE-UTTERANCE: liked UTTERANCE: I liked your car
    RECOGNITION: I like your cars
    RE-UTTERANCE: car

- MISTAKE DUE TO SIMILAR SOUND

UTTERANCE: She attacked me
    RECOGNITION: He attacked me
    RE-UTTERANCE: She

- RECOGNITION FAILURE IN UNITS OF WORDS AND PHASES

UTTERANCE: I would like to go
    RECOGNITION: I had to go
    RE-UTTERANCE: would like

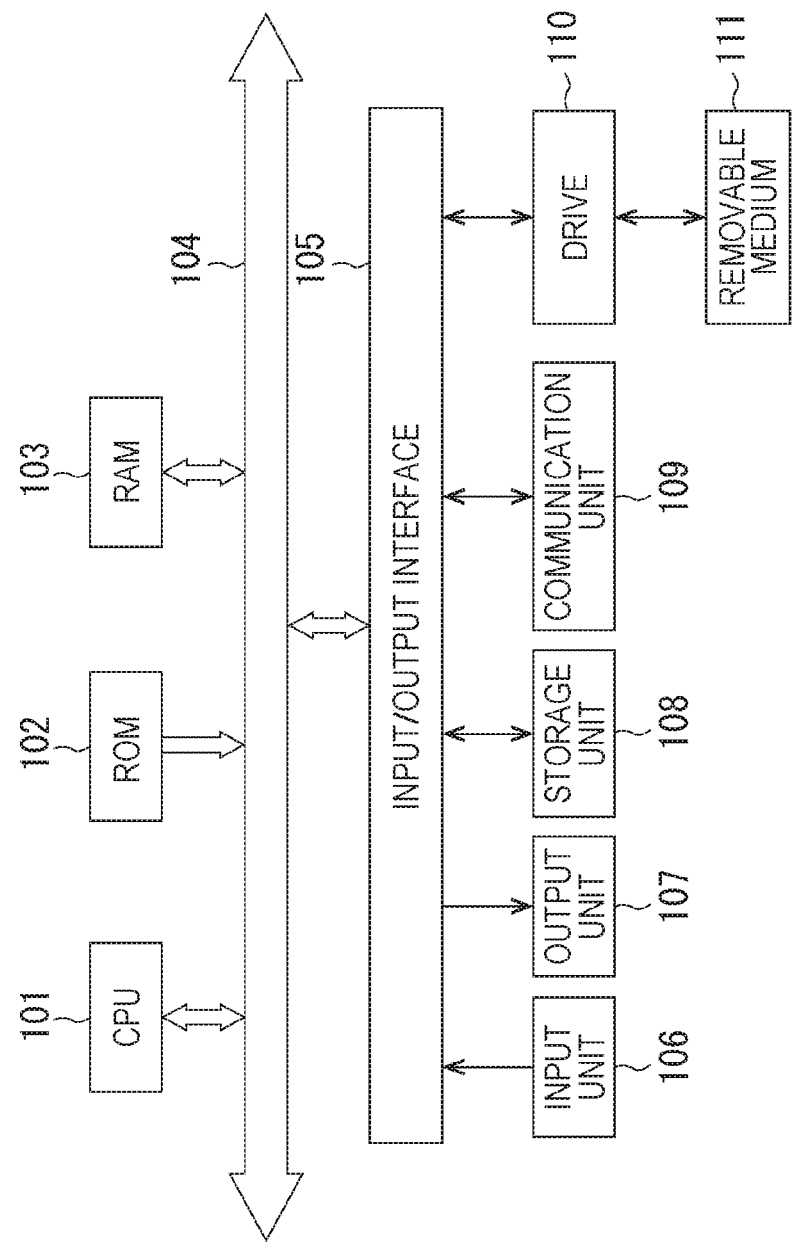

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/000014 filed on Jan. 4, 2018, which claims priority benefit of Japanese Patent Application No. JP 2017-007121 filed in the Japan Patent Office on Jan. 18, 2017. Each of the above-referenced applications is hereby incorporated herein by reference in its entirety.

TECHNICAL FIELD

The present disclosure relates to an information processing apparatus, an information processing method, and a program, and in particular to an information processing apparatus, an information processing method, and a program that enables provision of a more convenient speech recognition service.

BACKGROUND ART

In recent years, utilization of a user interface using speech input has been widespread and realization of speech recognition processing that enables more favorable speech input is important.

For example, Patent Document 1 discloses a technology of replacing a word included in a speech-recognized sentence on the basis of a language model based on context in the sentence, thereby improving accuracy of the sentence obtained as a speech recognition result.

CITATION LIST

Patent Document

Patent Document 1: Japanese Patent Application Laid-Open No. 2016-110087

SUMMARY OF THE INVENTION

Problems to be Solved by the Invention

However, in the above-described technology disclosed in Patent Document 1, the word is replaced depending on a past learning result and the like. Therefore, in a case where appropriate learning has not been performed, replacing the word as expected has been difficult. Therefore, the technology disclosed in Patent Document 1 cannot contribute to improving the accuracy of the sentence obtained as a speech recognition result, resulting in lowering the convenience as a speech recognition service.

The present technology has been made in view of the foregoing, and enables provision of a more convenient speech recognition service.

Solutions to Problems

An information processing apparatus according to one aspect of the present disclosure includes a speech recognition unit configured to perform speech recognition for speech information based on an utterance of a user, a correction portion estimation unit configured to collate content of a sentence obtained as a speech recognition result by the speech recognition unit with collation information necessary for determining accuracy of the content to estimate, for the sentence, a correction portion that requires correction, and a presenting unit configured to present, to the user, the sentence obtained as the speech recognition result together with the correction portion estimated by the correction portion estimation unit.

An information processing method or a program according to one aspect of the present disclosure includes performing speech recognition for speech information based on an utterance of a user, collating content of a sentence obtained as a speech recognition result with collation information necessary for determining accuracy of the content to estimate, for the sentence, a correction portion that requires correction, and presenting, to the user, the sentence obtained as the speech recognition result together with the estimated correction portion.

In one aspect of the present disclosure, speech recognition for speech information based on an utterance of a user is performed, and a correction portion that requires correction is estimated for a sentence obtained as a speech recognition result by collating content of the sentence with collation information necessary for determining accuracy of the content. Then, the sentence obtained as the speech recognition result is presented together with the estimated correction portion to the user.

Effects of the Invention

According to one aspect of the present disclosure, a more convenient speech recognition service can be provided.

BRIEF DESCRIPTION OF DRAWINGS

FIG. 4 is a diagram illustrating a first example of a user interface that presents a correction portion estimated on the basis of action information.

FIG. 5 is a diagram illustrating a second example of the user interface that presents a correction portion estimated on the basis of action information.

FIG. 7 is a diagram illustrating a second example of the user interface that presents a correction portion estimated on the basis of weather information.

FIG. 10 is a diagram for describing an example of speech recognition processing.

FIG. 12 is a diagram for illustrating editing corresponding processing.

FIG. 16 is a diagram illustrating an example of a database referred to for generation of speech information for editing speech recognition.

FIG. 18 is a diagram for illustrating a case where various types of editing based on re-utterance of the user.

FIG. 22 is a block diagram illustrating a configuration example of an embodiment of a computer to which the present technology is applied.

MODE FOR CARRYING OUT THE INVENTION

Hereinafter, specific embodiments to which the present technology is applied will be described in detail with reference to the drawings.

<Configuration Example of Speech Recognition System>

Figure 1:
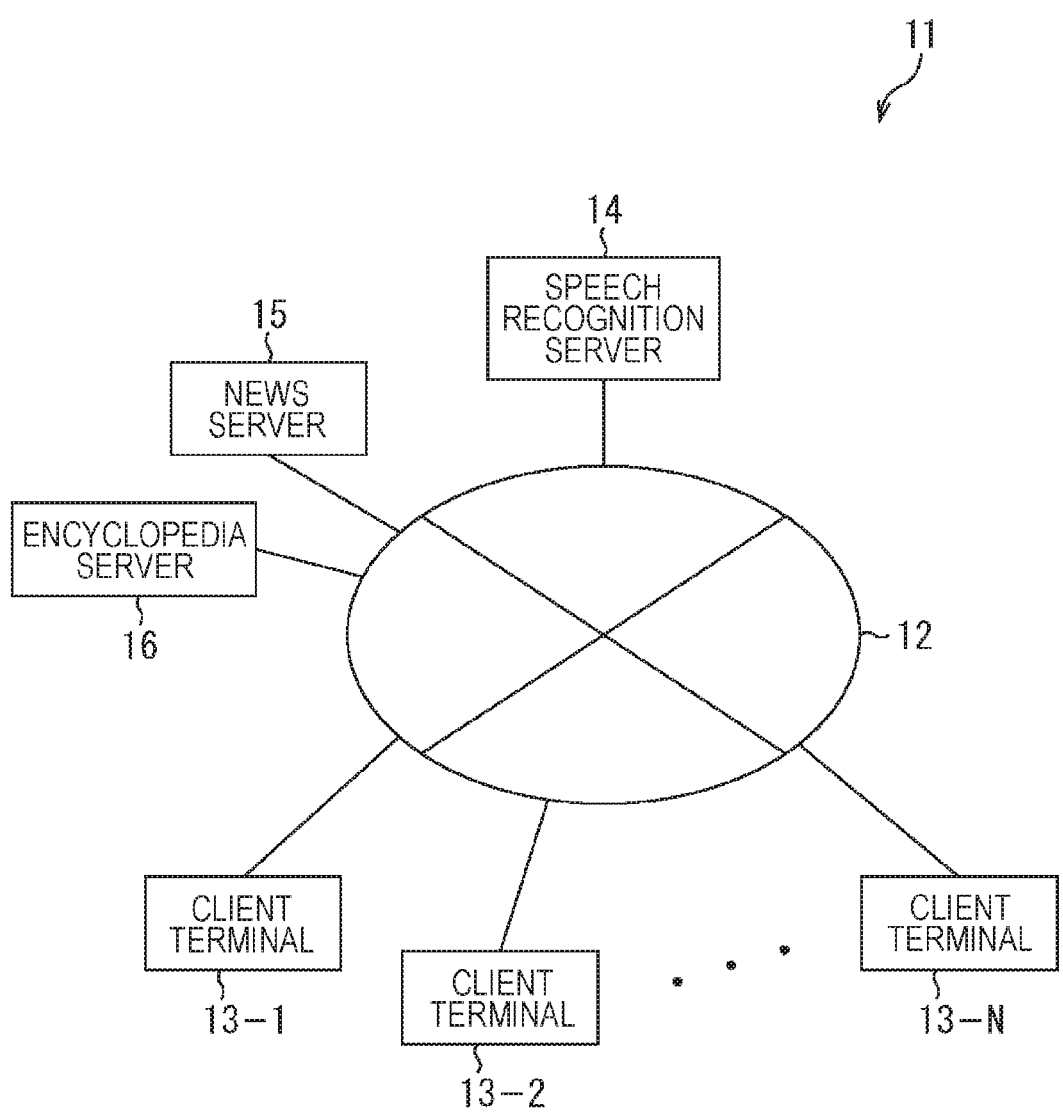
FIG. 1 is a block diagram illustrating a configuration example of an embodiment of a speech recognition system to which the present technology is applied.

FIG. 1 is a block diagram illustrating a configuration example of an embodiment of a speech recognition system to which the present technology is applied.

As illustrated in FIG. 1, a speech recognition system 11 is configured such that a plurality (N in the example in FIG. 1) client terminals 13-1 to 13-N and a speech recognition server 14 are connected via a network 12 such as the Internet. Note that the client terminals 13-1 to 13-N are similarly configured and are referred to as client terminal 13 as appropriate in a case where there is no need to distinguish one another.

Furthermore, a news server 15 that provides information regarding general news and weather and an encyclopedia server 16 that provides information regarding knowledge and commentary on various fields are connected to the network 12. Note that, in the present embodiment to be described below, the information provided by the news server 15 and the encyclopedia server 16 is also referred to as fact information.

For example, in the speech recognition system 11, speech information based on utterance of a user who possesses each client terminal 13 is transmitted to the speech recognition server 14 via the network 12, and speech recognition processing is executed in the speech recognition server 14. Then, the speech recognition server 14 transmits a sentence (character information) containing a word string obtained as a speech recognition result to the client terminal 13 of the user who has made the utterance via the network 12. As a result, the client terminal 13 can display and present the speech recognition result of the utterance of the user to the user.

The speech recognition system 11 configured as described above can provide speech recognition processing that enables more favorable speech input even if processing capability of an individual client terminal 13 is low by installing latest high-performance speech recognition processing in the speech recognition server 14, for example.

Figure 2:
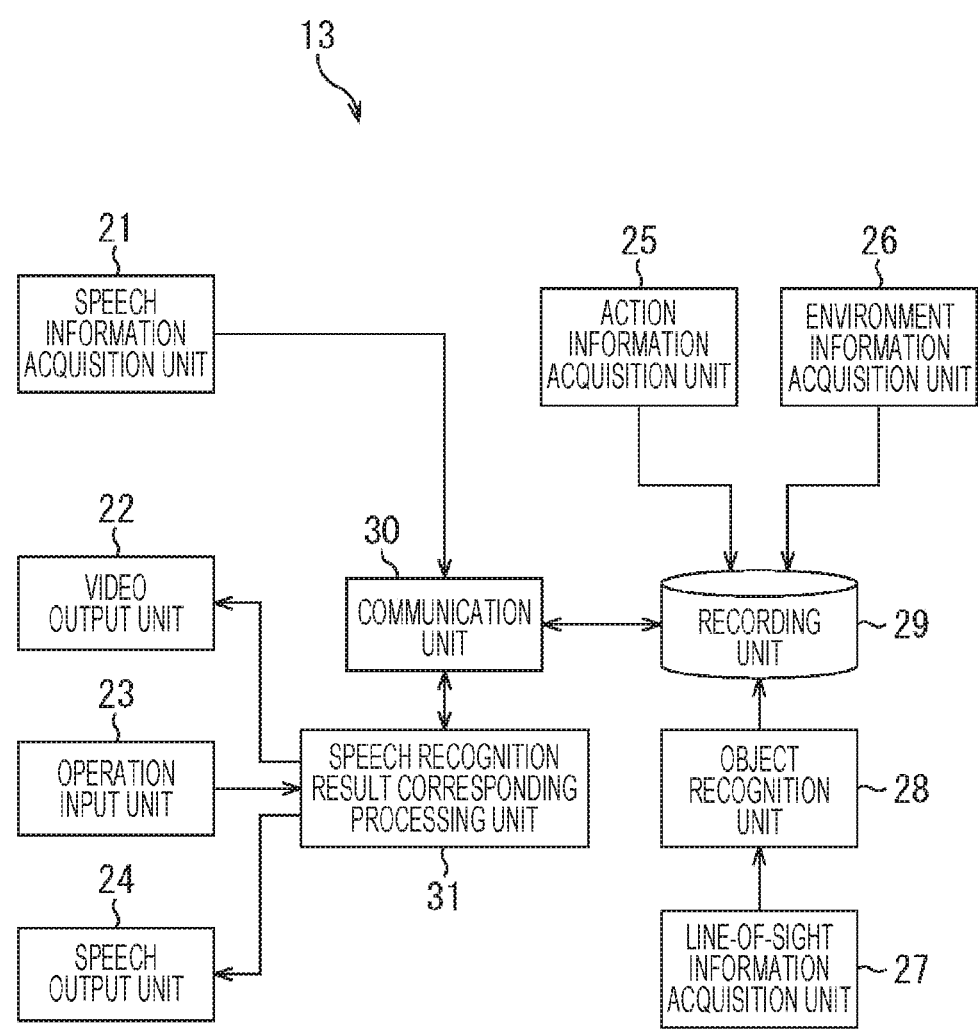
FIG. 2 is a diagram illustrating a configuration example of a client terminal.

FIG. 2 is a diagram illustrating a configuration example of a client terminal 13.

As illustrated in FIG. 2, the client terminal 13 includes an speech information acquisition unit 21, a video output unit 22, an operation input unit 23, an speech output unit 24, an action information acquisition unit 25, an environment information acquisition unit 26, a line-of-sight information acquisition unit 27, an object recognition unit 28, a recording unit 29, a communication unit 30, and a speech recognition result corresponding processing unit 31.

The speech information acquisition unit 21 is configured by, for example, a microphone for acquiring the speech information, and acquires the speech information based on the speech uttered by the user and supplies the speech information to the communication unit 30. Then, the speech information is transmitted from the communication unit 30 to the speech recognition server 14 via the network 12 in FIG. 1.

The video output unit 22 is configured by, for example, a display for outputting video, and displays the speech recognition result based on the utterance of the user and presents the speech recognition result to the user. Furthermore, the video output unit 22 displays various user interfaces used in processing of correcting or editing the speech recognition result, for example, as will be described with reference to FIGS. 4, 5, 6, 7, 8, 9, 10, 11, 12, 13, 14, 15, 16, 17A, and 17B below.

The operation input unit 23 is configured by, for example, a touch panel for inputting a touch operation of the user on the display constituting the video output unit 22. Then, when the user performs a touch operation on the user interface displayed on the video output unit 22, the operation input unit 23 supplies operation information indicating content of an operation input by the touch operation to the speech recognition result corresponding processing unit 31.

The sound output unit 24 is configured by, for example, a speaker or the like for outputting a speech, and outputs the speech recognition result for the speech information based on the utterance of the user by synthetic speech (text to speech (TSS)).

The action information acquisition unit 25 is configured by, for example, a global positioning system (GPS) device, an acceleration sensor, and the like, and regularly acquires position information, acceleration information, and the like associated with an action of the user as action information and successively supplies the action information to the recording unit 29.

The environment information acquisition unit 26 is configured by, for example, a temperature sensor, a humidity sensor, and the like, and regularly acquires temperature, humidity, and the like indicating an environment around the user as environment information and successively supplies the environmental information to the recording unit 29.

The line-of-sight information acquisition unit 27 is configured by, for example, an imaging device capable of imaging movement of a pupil of the user, and acquires line-of-sight information indicating a direction of a line of sight of the user and supplies the line-of-sight information to the object recognition unit 28.

The object recognition unit 28 is configured by, for example, an imaging device capable of imaging an object located ahead of the line of sight of the user, and specifies an object recognized by the user on the basis of the line-of-sight information supplied from the line-of-sight information acquisition unit 27 and performs object recognition processing for the specified object. Then, the object recognition unit 28 supplies object recognition information indicating a result of the recognition of the object to the recording unit 29 together with the line-of-sight information.

The recording unit 29 is configured of, for example, a memory, a hard disk drive, and the like, and records the action information supplied from the action information acquisition unit 25, the environment information supplied from the environment information acquisition unit 26, and the line-of-sight information and the object recognition information supplied from the object recognition unit 28.

The communication unit 30 is configured by a communication module for performing communication via the network 12, and transmits and receives various types of information to and from the speech recognition server 14. For example, the recording unit 29 transmits the speech information supplied from the speech information acquisition unit 21 to the speech recognition server 14 and supplies the speech recognition result transmitted from the speech recognition server 14 to the speech recognition result corresponding processing unit 31. Furthermore, when information requesting collation information is transmitted from the speech recognition server 14, as described below, the communication unit 30 reads information according to the request from among the various types of information recorded in the recording unit 29 as the collation information and supplies the read information to the speech recognition server 14.

When the speech recognition result transmitted from the speech recognition server 14 is supplied from the communication unit 30, the speech recognition result corresponding processing unit 31 supplies a sentence (character information) indicating the speech recognition result to the video output unit 22 to display the sentence. Furthermore, in a case where information for confirming a correction portion is added to the speech recognition result, the speech recognition result corresponding processing unit 31 generates a user interface for confirming a correction portion according to the information and causes the video output unit 22 to display the user interface together with the speech recognition result. Then, when the operation information according to the touch operation of the user on the user interface for confirming a correction portion is supplied from the operation input unit 23, the speech recognition result corresponding processing unit 31 reflects correction for the speech recognition result according to the operation information.

Furthermore, when operation information instructing editing is supplied from the operation input unit 23 to the speech recognition result displayed on the video output unit 22, the speech recognition result corresponding processing unit 31 specifies an object to be edited instructed by the user. Then, the speech recognition result corresponding processing unit 31 transmits information indicating the object to be edited to the speech recognition server 14 via the communication unit 30, and causes the video output unit 22 to display a user interface prompting re-utterance for deleting and replacing an editing portion specified as the object to be edited. Thereafter, the speech information of the re-utterance acquired by the speech information acquisition unit 21 is transmitted to the speech recognition server 14, speech recognition for the speech information of the re-utterance is performed, and replacement information for replacing the correction portion is transmitted. As a result, the speech recognition result corresponding processing unit 31 supplies a speech recognition result reflecting the editing by replacing the correction portion with the replacement information to the video output unit 22 and causes the video output unit 22 to present the speech recognition result to the user.

Figure 3:
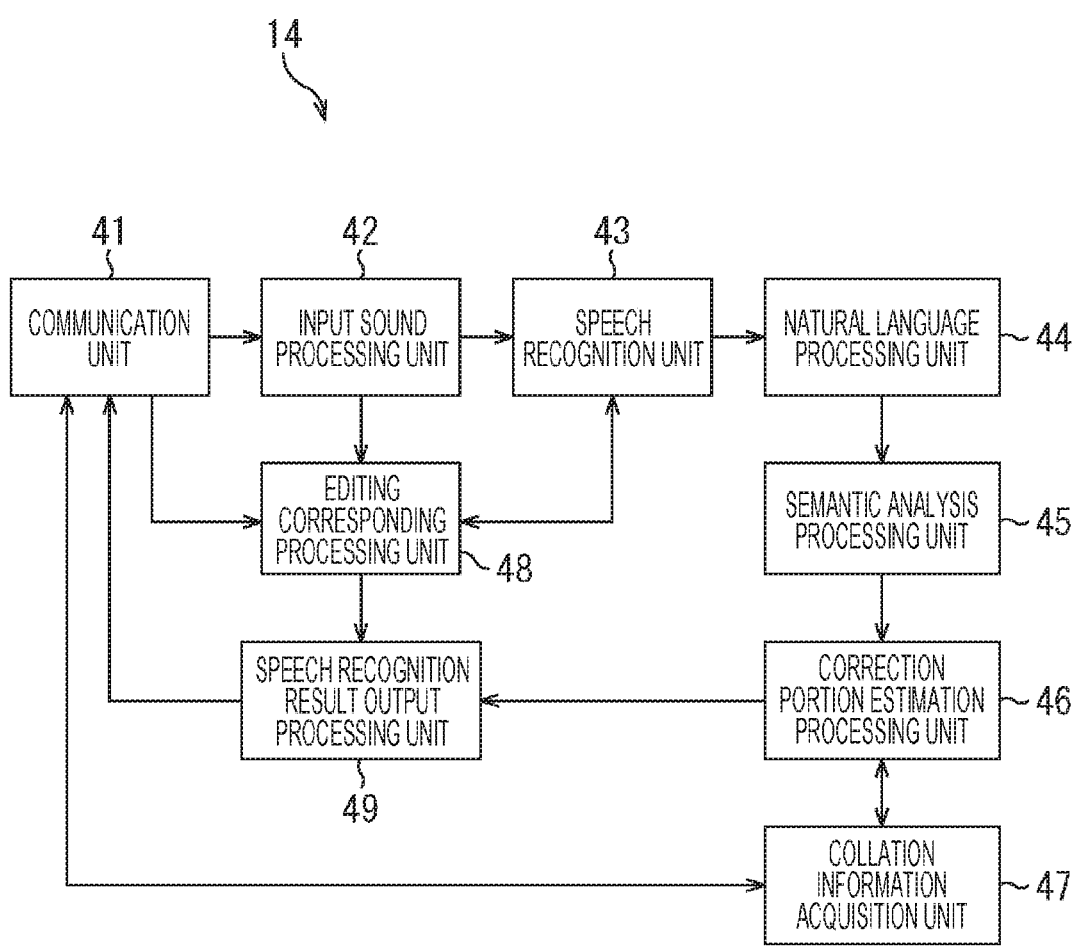
FIG. 3 is a block diagram illustrating a configuration example of a speech recognition server.

FIG. 3 is a block diagram illustrating a configuration example of a speech recognition server 14.

As illustrated in FIG. 3, the speech recognition server 14 includes a communication unit 41, an input sound processing unit 42, a speech recognition unit 43, a natural language processing unit 44, a semantic analysis processing unit 45, a correction portion estimation processing unit 46, a collation information acquisition unit 47, an editing corresponding processing unit 48, and a speech recognition result output processing unit 49.

The communication unit 41 is configured by a communication module for performing communication via the network 12, and transmits and receives various types of information to and from the client terminal 13. For example, the communication unit 41 receives the speech information transmitted from the client terminal 13 and supplies the speech information to the input sound processing unit 42, and transmits the speech recognition result information supplied from the speech recognition result output processing unit 49 to the client terminal 13.

The input sound processing unit 42 performs various types of preprocessing necessary for the speech information supplied from the communication unit 41 before performing speech recognition in the speech recognition unit 43. For example, the input sound processing unit 42 excludes a section of silence and a section of only noise in the speech information, performs voice activity detection (VAD) processing of detecting an utterance section including an uttered speech from the speech information, and supplies the speech information in the utterance section to the speech recognition unit 43.

The speech recognition unit 43 performs speech recognition for the speech information supplied from the input sound processing unit 42, recognizes the utterance of the user based on the speech information for each word, and outputs a sentence containing a word string to the natural language processing unit 44 as a speech recognition result.

The natural language processing unit 44 performs natural language processing (morphological analysis, syntax analysis, and the like) of recognizing the sentence representing the speech recognition result supplied from the speech recognition unit 43 as a natural language daily used by humans and supplies the speech recognition result to which the natural language processing has been applied to the semantic analysis processing unit 45. For example, the natural language processing unit 44 can specify a part of speech of each word constituting the sentence by performing the natural language processing.

The semantic analysis processing unit 45 performs semantic analysis processing of analyzing the meaning of the sentence for the sentence representing the speech recognition result to which the natural language processing has been applied in the natural language processing unit 44 and supplies content (semantic analysis result) of the sentence indicated by the speech recognition result to the correction portion estimation processing unit 46.

The correction portion estimation processing unit 46 performs processing of estimating, for the sentence, a correction portion that requires correction on the basis of accuracy of the content of the sentence indicated by the speech recognition result supplied from the semantic analysis processing unit 45. At this time, the correction portion estimation processing unit 46 acquires collation information necessary for determining the accuracy of the content of the sentence indicated by the speech recognition result via the collation information acquisition unit 47. For example, the fact information including various data such as action data, weather data, and statistical data can be used as the collation information. In other words, as described above, the action information, the environment information, the line-of-sight information, the object recognition information, and the like recorded in the client terminal 13 can be used as the collation information. Furthermore, news information, weather information, and the like provided by the news server 15, and various articles provided by the encyclopedia server 16 can be used as the collation information. In addition, for example, various types of fact information confirmed as facts such as "the number of visitors to the oo theme park on the previous day was one million" and "traffic jam on the 00 highway on the previous day was an average of 15 km" can be used as the collation information. Then, the correction portion estimation processing unit 46 collates content of the sentence indicated by the speech recognition result with the collation information and notifies the correction portion to the speech recognition result output processing unit 49 in a case of estimating that there is the correction portion that requires correction, as described below with reference to FIGS. 4 to 9.

The collation information acquisition unit 47 transmits information requesting the collation information required by the correction portion estimation processing unit 46 via the communication unit 41, acquires the collation information transmitted in response to the request, and supplies the collation information to the correction portion estimation processing unit 46. For example, in a case where the collation information required by the correction portion estimation processing unit 46 is the action information of the user, the collation information acquisition unit 47 requests the client terminal 13 to transmit the action information of the user. Furthermore, in a case where the collation information required by the correction portion estimation processing unit 46 is the weather information, the collation information acquisition unit 47 requests the news server 15 to transmit the weather information.

The editing corresponding processing unit 48 deletes phoneme information of a word specified as an object to be edited from the stored speech information of the speech recognition result, and connects the speech information of the re-utterance to the deleted editing portion to create speech information for editing speech recognition, as described below with reference to FIGS. 10 to 13. Then, the editing corresponding processing unit 48 supplies the speech information for editing speech recognition to the speech recognition unit 43 to perform speech recognition, thereby acquiring a word indicated by the speech information of the re-utterance as the replacement information, and supplies the replacement information to the speech recognition result output processing unit 49.

In a case where the correction portion that requires correction has been estimated for the sentence indicated by the speech recognition result by the correction portion estimation processing unit 46, the speech recognition result output processing unit 49 adds information for confirming the estimated correction portion to the speech recognition result and transmits the speech recognition result to the client terminal 13 via the communication unit 41. Note that, in a case where the correction portion that requires correction has not been estimated for the sentence indicated by the speech recognition result by the correction portion estimation processing unit 46, the speech recognition result output processing unit 49 transmits only the speech recognition result to the client terminal 13.

Furthermore, when the replacement information is supplied from the editing corresponding processing unit 48, the speech recognition result output processing unit 49 transmits the replacement information to the client terminal 13 via the communication unit 41. Furthermore, in a case of transmitting a synthesized speech as the speech recognition result, the speech recognition result output processing unit 49 can generate and transmit a synthesized speech that reads out the sentence indicated by the speech recognition result.

In the speech recognition system 11 including the client terminal 13 and the speech recognition server 14 configured as described above, the speech recognition server 14 collates the content of the sentence obtained as the speech recognition result with the collation information necessary for determining the accuracy of the content and can estimate, for the sentence, the correction portion that requires correction. Here, as the collation information, the fact information provided by the news server 15 and the encyclopedia server 16, the action information of the user recorded in the client terminal 13, and the like are used.

Then, the speech recognition server 14 transmits the information for confirming the correction portion to the client terminal 13 together with the speech recognition result. In response to the transmission, the client terminal 13 displays the user interface for confirming the correction portion estimated in the speech recognition server 14 and can reflect correction on the speech recognition result when an operation to instruct the correction of the correction portion is performed by the user.

Moreover, in the speech recognition system 11, the client terminal 13 can specify an object to be edited when an operation to instruct editing of the sentence of the speech recognition result is performed by the user. Then, the client terminal 13 transmits the speech information of the re-utterance to the speech recognition server 14. In response to the transmission, the speech recognition server 14 deletes the editing portion to be the object to be edited from the stored speech information, performs speech recognition after connecting the speech information of the re-utterance to the editing portion, and transmits the speech recognition result reflecting the editing to the client terminal 13.

As a result, the client terminal 13 can display and present the speech recognition result reflecting the editing to the user. Note that the speech recognition system 11 may specify the correction portion as the object to be edited when correcting the correction portion estimated by the speech recognition server 14, for example, and can correct (edit) the correction portion according to the speech information of the re-utterance for correcting the correction portion.

As described above, the speech recognition system 11 can easily correct or edit the sentence obtained as the speech recognition result by estimating the correction portion for the sentence of the speech recognition result and reflecting the editing by the user. As a result, the speech recognition system 11 can provide a more convenient speech recognition service.

<Example of User Interface for Presenting Correction Portion>

User interfaces presenting a correction portion estimated for a sentence obtained as a speech recognition result will be described with reference to FIGS. 4 to 9.

FIG. 4 illustrates a first example of the user interface presenting the correction portion estimated for the sentence obtained as the speech recognition result on the basis of the action information. For example, it is assumed that, in creating a message informing an event on a day when the day is done such as before going to bed, the user utters, to the client terminal 13, "I went to Ebisu during the day and shopped in Ikebukuro until 17 o'clock".

First, in the client terminal 13, the speech information acquisition unit 21 acquires the speech information based on the utterance of the user, and the communication unit 30 transmits the speech information to the speech recognition server 14.

Then, in the speech recognition server 14, the speech recognition unit 43 performs speech recognition for the speech information to acquire the speech recognition result "I went to Ebisu during the day and shopped in Ikebukuro until 17 o'clock". Then, the correction portion estimation processing unit 46 recognizes that the action information of the user is necessary as the collation information for determining the accuracy of the content (a time zone and a place) of the sentence indicated by such a speech recognition result. In response to the recognition, the collation information acquisition unit 47 transmits, to the client terminal 13, information requesting the action information of the user in the time zone based on the sentence indicated by the speech recognition result as the collation information.

In the client terminal 13, according to the information requesting the action information of the user as the collation information, the communication unit 30 reads out information according to the request from among various information recorded in the recording unit 29 and transmits the read information to the speech recognition server 14 as the collation information.

In response to the transmission, in the speech recognition server 14, the collation information acquisition unit 47 acquires the action information transmitted from the client terminal 13 and supplies the action information to the correction portion estimation processing unit 46. The correction portion estimation processing unit 46 collates the content of the sentence indicated by the speech recognition result with the action information of the user and estimates, for the sentence, whether or not there is a correction portion that requires correction. For example, in a case where the place in the time zone indicated by the speech recognition result does not match the place indicated by the action information in the time zone, the correction portion estimation processing unit 46 can estimate that the place indicated by the speech recognition result as the correction portion.

In the example illustrated in FIG. 4, the correction portion estimation processing unit 46 collates the place "Ebisu" in the time zone "day" indicated by the speech recognition result with the place indicated in the action information in the time zone. Similarly, the correction portion estimation processing unit 46 collates the place "Ikebukuro" in the time zone "17 o'clock" indicated by the speech recognition result with the place indicated in the action information in the time zone. As a result, since the place "Ikebukuro" in the time zone "17 o'clock" indicated by the speech recognition result does not match the place "Shinjuku" indicated in the action information in the time zone, the correction portion estimation processing unit 46 estimates the place "Ikebukuro" indicated by the speech recognition result as the correction portion.

The correction portion estimation processing unit 46 adds the information for confirming the correction portion to the speech recognition result on the basis of the estimation and transmits the speech recognition result to the client terminal 13. Therefore, the client terminal 13 can display the user interface for confirming the word estimated as the correction portion together with the sentence indicating the speech recognition result according to the information for confirming the correction portion.

In the example illustrated in FIG. 4, a user interface "Is this correct?" for confirming whether or not the place is correct is displayed for the place "Ikebukuro" estimated as the correction part. Furthermore, a GUI (YES button/NO button) for inputting a confirmation result by the user is displayed on the user interface. Note that the characters of the place "Ikebukuro" estimated as the correction portion may be highlighted, may be displayed by changing color and size, or may be displayed in a blinking manner. Furthermore, a synthesized speech "Is this correct?" may be output.

In a case where the user thinks that the place "Ikebukuro" indicated by the speech recognition result is correct, the user performs a touch operation on the Yes button on the user interface. With the touch operation, the place "Ikebukuro" indicated by the speech recognition result is determined. On the other hand, in a case where the user thinks that the place "Ikebukuro" indicated by the speech recognition result is incorrect, the user performs a touch operation on the No button on the user interface. With the touch operation, the user can easily correct the place "Ikebukuro" indicated by the speech recognition result. For example, in this case, processing of deleting the correction portion, displaying the user interface prompting the user to perform re-utterance, and replacing the correction portion on the basis of speech information of the re-utterance can be performed.

Next, FIG. 5 illustrates a second example of the user interface presenting the correction portion estimated for the sentence obtained as the speech recognition result on the basis of the action information. For example, it is assumed that, in creating a message informing an event on a day when the day is done such as before going to bed, the user utters, to the client terminal 13, "I went to Ebisu during the day and shopped at the XYZ shop at 17 o'clock".

Similarly to the description given with reference to FIG. 4, the correction portion estimation processing unit 46 requests the action information of the user as the collation information for determining the accuracy of the content (the time zone and the place) of the sentence indicated by the speech recognition result, and collates the content of the sentence indicated by the speech recognition result with the action information of the user. As a result, in the example illustrated in FIG. 5, the place "XYZ shop" in the time zone "17 o'clock" indicated by the speech recognition result does not match the place "Shinjuku" indicated in the action information in the time zone, and thus the correction portion estimation processing unit 46 estimates the place "XYZ shop" indicated by the speech recognition result as the correction portion.

A user interface for confirming whether or not the place "XYZ shop" estimated as the correction portion is correct "Here is Shinjuku in the record. Is this (XYZ shop) correct?" is displayed on the basis of the estimation. Furthermore, a GUI (YES button/NO button) for inputting a confirmation result by the user is displayed on the user interface.

In a case where the user thinks that the place "XYZ shop" indicated by the speech recognition result is correct, the user performs a touch operation on the Yes button on the user interface. With the touch operation, the place "XYZ shop" indicated by the speech recognition result is determined. On the other hand, in a case where the user thinks that the place "XYZ shop" indicated by the speech recognition result is incorrect, the user performs a touch operation on the No button on the user interface. In this case, the place "XYZ shop" indicated by the speech recognition result is corrected to "Shinjuku".

As described with reference to FIGS. 4 and 5, in a case where there is a difference between granularity of the information recorded in the client terminal 13 and granularity of the information in the sentence representing the speech recognition result, the speech recognition system 11 can estimate the information as correction portion and present the correction portion together with the speech recognition result.

Figure 6:
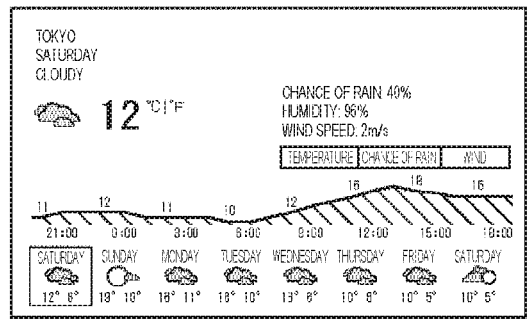
FIG. 6 is a diagram illustrating a first example of a user interface that presents a correction portion estimated on the basis of weather information.

Next, FIG. 6 illustrates a first example of the user interface presenting the correction portion estimated for the sentence obtained as the speech recognition result on the basis of the weather information. For example, it is assumed that, in creating a message informing an event on a day when the day is done such as before going to bed, the user utters "Today was sunny" to the client terminal 13.

First, in the client terminal 13, the speech information acquisition unit 21 acquires the speech information based on the utterance of the user, and the communication unit 30 transmits the speech information to the speech recognition server 14.

Then, in the speech recognition server 14, the speech recognition unit 43 performs speech recognition for the speech information to acquire the speech recognition result "Today was stormy" (the speech recognition unit 43 incorrectly acquires the speech recognition because of similar pronunciations). With the acquisition, the correction portion estimation processing unit 46 recognizes that the weather information of the day is necessary as the collation information for determining whether or not the content (weather) of the sentence indicated by such a speech recognition result is accurate. Therefore, the collation information acquisition unit 47 requests the news server 15 to transmit the weather information of the day.

Thereafter, in the speech recognition server 14, the collation information acquisition unit 47 acquires the weather information transmitted from the news server 15 and supplies the news information to the correction portion estimation processing unit 46. The correction portion estimation processing unit 46 collates the content of the sentence indicated by the speech recognition result with the weather information and estimates the correction portion that requires correction for the sentence. For example, the correction portion estimation processing unit 46 can estimate the weather of the speech recognition result not matching the weather information as the correction portion.

In the example illustrated in FIG. 6, the correction portion estimation processing unit 46 collates the weather "stormy" of the speech recognition result with the weather information. Then, when the correction portion estimation processing unit 46 recognizes that the weather on the day was not "stormy" according to the weather information, the correction portion estimation processing unit 46 can estimate the weather "stormy" of the speech recognition result as the correction portion.

The correction portion estimation processing unit 46 adds the information for confirming the correction portion to the speech recognition result on the basis of the estimation and transmits the speech recognition result to the client terminal 13. Therefore, the client terminal 13 can display the user interface for confirming the word estimated as the correction portion together with the sentence indicating the speech recognition result according to the information for confirming the correction portion.

In the example illustrated in FIG. 6, the weather "stormy" estimated as the correction portion in the speech recognition result is automatically corrected to the weather "sunny", and a user interface for confirming whether or not the correction is correct "Here has been automatically corrected" is displayed. Furthermore, a GUI (good button/return to original information (stormy) button) for inputting a confirmation result by the user is displayed on the user interface.

In a case where the user thinks that the weather "sunny" indicated by the automatically corrected speech recognition result is correct, the user performs a touch operation on the good button on the user interface. As a result, the weather "sunny" indicated by the speech recognition result is determined. On the other hand, in a case where the user thinks that the weather "sunny" indicated by the automatically corrected speech recognition result is incorrect, the user performs a touch operation on the return to original information (stormy) button on the user interface. In this case, the weather "sunny" indicated by the automatically corrected speech recognition result is corrected to "stormy".

Next, FIG. 7 illustrates a second example of the user interface presenting the correction portion estimated for the sentence obtained as the speech recognition result on the basis of the weather information. For example, it is assumed that, in talking with a virtual agent using the speech recognition function provided by the speech recognition system 11, the user utters "Today was sunny" to the client terminal 13.

In response to the utterance, the correction portion estimation processing unit 46 estimates the weather "stormy" of the speech recognition result as the correction portion because the weather information is not "stormy", similarly to the description given with reference to FIG. 6.

Then, in the example illustrated in FIG. 7, in a response of the agent "Today was sunny here/Is stormy correct?" to the utterance of the user "Today was sunny" is displayed, so that the information to be corrected is notified. In response to such a response of the agent, the user can talk with the agent by replying on the basis of the user's own recognition. Then, by repeating such conversation with the agent a plurality of turns, the user can reduce the stress.

As described with reference to FIGS. 6 and 7, in a case where the speech recognition system 11 collates the speech recognition result with the fact information such as the weather information and the accuracy of the information in the sentence representing the speech recognition result is low, the speech recognition system 11 can estimate the information as the correction portion and automatically correct and present the speech recognition result.

Next, processing of recognizing and automatically correcting an object located ahead of a line of sight of the user when performing translation using the speech recognition function provided by the speech recognition system 11 will be described with reference to FIGS. 8 and 9.

Figure 8:
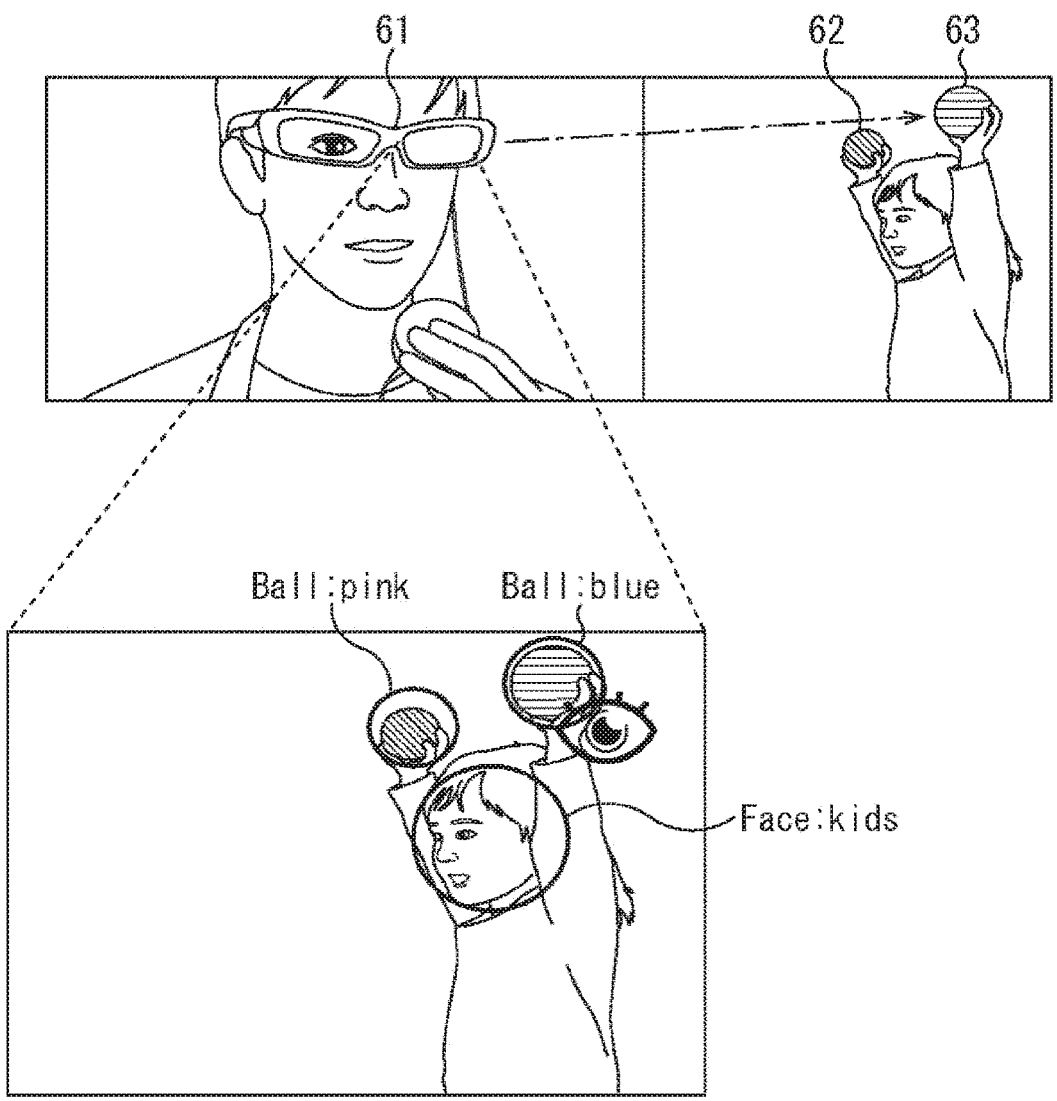
FIG. 8 is a diagram for describing recognition of an object located ahead of a line of sight of a user.

For example, as illustrated in FIG. 8, the user wears a pair of wearable goggles 61 incorporating the line-of-sight information acquisition unit 27 and the object recognition unit 28 illustrated in FIG. 2. Then, the line-of-sight information acquisition unit 27 recognizes the line of sight of the user as illustrated as the arrow of one-dot chain line in FIG. 8, and the object recognition unit 28 can perform object recognition for the object visually recognized by the user.

The example in FIG. 8 illustrates a state in which a child carries a pink ball 62 and a blue ball 63 in both hands and the line of sight of the user is heading toward the blue ball 63. Therefore, the object recognition unit 28 superimposes and displays a user interface (pupil mark) indicating a result of the recognition of the line of sight of the user on the blue ball, and the object recognition result being the blue ball (Ball: Blue) is displayed.

Figure 9:
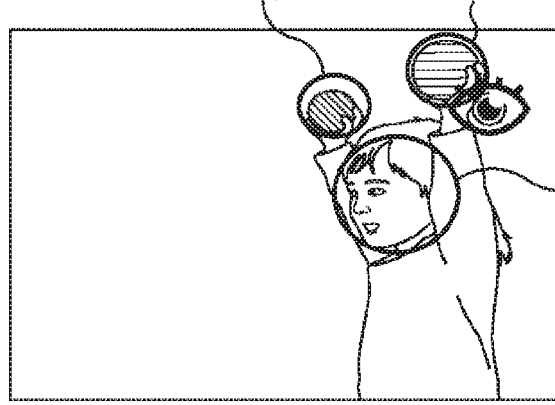
FIG. 9 is a diagram illustrating an example of a user interface that presents a correction portion estimated on the basis of object recognition information.

In such a situation, as illustrated in FIG. 9, it is assumed that the user utters "please pass the green ball" to the client terminal 13.

First, in the client terminal 13, the speech information acquisition unit 21 acquires the speech information based on the utterance of the user, and the communication unit 30 transmits the speech information to the speech recognition server 14.

Then, in the speech recognition server 14, the speech recognition unit 43 performs speech recognition for the speech information to acquire the speech recognition result "Please pass the green ball". Then, the correction portion estimation processing unit 46 recognizes that the object recognition information is necessary as the collation information for determining the accuracy of the content (object) of the sentence indicated by such a speech recognition result. In response to the recognition, the collation information acquisition unit 47 transmits, to the client terminal 13, information requesting the object recognition information of when the utterance of the user has been made as the collation information.

In the client terminal 13, according to the information requesting the object recognition information of the user as the collation information, the communication unit 30 reads out information according to the request from among various information recorded in the recording unit 29 and transmits the read information to the speech recognition server 14 as the collation information.

In response to the transmission, in the speech recognition server 14, the collation information acquisition unit 47 acquires the object recognition information transmitted from the client terminal 13 and supplies the object recognition information to the correction portion estimation processing unit 46. The correction portion estimation processing unit 46 collates the content of the sentence indicated by the speech recognition result with the object recognition information and estimates, for the sentence, whether or not there is a correction portion that requires correction. For example, in a case where the object indicated by the speech recognition result does not match the object indicated in the object recognition information, the correction portion estimation processing unit 46 can estimate the object indicated by the speech recognition result as the correction portion.

In the example illustrated in FIG. 9, the correction portion estimation processing unit 46 collates the object "green ball" indicated by the speech recognition result with the object recognition information "blue ball (Ball: Blue)" as described with reference to FIG. 8. As a result, since the object "green ball" indicated by the speech recognition result does not match the object recognition information "blue ball (Ball: Blue)", the correction portion estimation processing unit 46 estimates the object "green ball" indicated by the speech recognition result as the correction portion.

The correction portion estimation processing unit 46 adds the information for confirming the correction portion to the speech recognition result on the basis of the estimation and transmits the speech recognition result to the client terminal 13. Therefore, the client terminal 13 can display the user interface for confirming the word estimated as the correction portion together with the sentence indicating the speech recognition result according to the information for confirming the correction portion.

In the example illustrated in FIG. 9, the color "green" of the object estimated as the correction portion in the speech recognition result is automatically corrected to the color "blue", and a user interface for confirming whether or not the correction is correct "Here has been automatically corrected" is displayed. Furthermore, a GUI (good button/ return to original information (green) button) for inputting a confirmation result by the user is displayed on the user interface. Moreover, a translation result "Please pass blue balls" of translation using the speech recognition result is displayed.

In a case where the user thinks that the color "blue" of the object indicated by the automatically corrected speech recognition result is correct, the user performs a touch operation on the good button on the user interface. As a result, the color "blue" of the object indicated by the speech recognition result is determined. On the other hand, in a case where the user thinks that the color "blue" of the object indicated by the automatically corrected speech recognition result is incorrect, the user performs a touch operation on the return to original information (green) button on the user interface. In this case, the color "blue" of the object indicated by the automatically corrected speech recognition result is corrected to "green".

As described with reference to FIGS. 8 and 9, in a case where the speech recognition system 11 collates the speech recognition result with the object recognition information recorded in the client terminal 13 and the accuracy of the information in the sentence representing the speech recognition result is low, the speech recognition system 11 can estimate the information as the correction portion and automatically correct and present the speech recognition result.

<Example of User Interface Accepting Editing of Speech Recognition Result>

A user interface for editing the speech recognition result based on the speech recognition processing by the speech recognition system 11 will be described with reference to FIGS. 10 to 13.

For example, as illustrated in FIG. 10, in the client terminal 13, the speech information acquisition unit 21 acquires the speech information of the illustrated waveform according to the utterance of the user "I drove your car to airport every day". Then, in the speech recognition server 14, the speech recognition unit 43 executes the speech recognition processing on the basis of the speech information, acquires a sentence (character information) containing a word string recognized as a speech recognition result, and specifies correspondence between each word and phoneme information obtained from the speech information. Moreover, in the speech recognition server 14, the natural language processing unit 44 specifies a part of speech of each word of the speech recognition result and acquires part of speech information. Here, in the speech recognition server 14, the speech information, the correspondence between the words and the phoneme information, and the part of speech information are temporarily stored.

Then, in a case where there is no correction portion as a result of the correction portion estimation processing unit 46 estimating the correction portion as described above, the speech recognition result "I drove your car to airport every day" is displayed on the video output unit 22 of the client terminal 13.

By the way, even when the utterance of the user matches the speech recognition result, the user may wish to edit uttered content.

Figure 11:
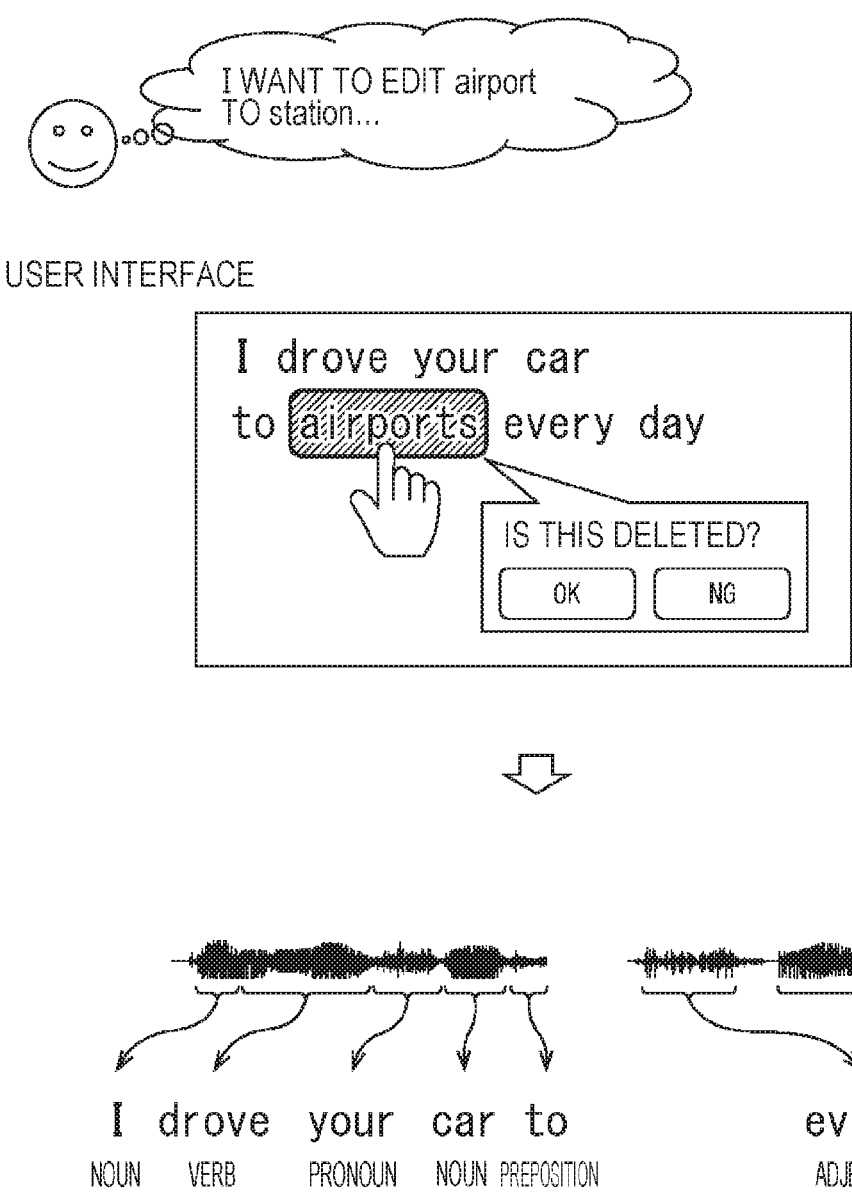
FIG. 11 is a diagram illustrating an example of a user interface for editing a speech recognition result.

For example, as illustrated in FIG. 11, in a case where the user wishes to edit the word "airport" displayed on the video output unit 22 to the word "station", the user long presses the portion where the word "airport" that the user wishes to edit is displayed. In response to the operation, the operation input unit 23 supplies the operation information indicating the content of the operation to the speech recognition result corresponding processing unit 31, and the speech recognition result corresponding processing unit 31 specifies the word "airport" displayed on the video output unit 22 as the object to be edited. Then, the speech recognition result corresponding processing unit 31 can display the user interface for editing the speech recognition result.

In the example illustrated in FIG. 11, a user interface for confirming deletion of the word "is this deleted?" is displayed for the word "airport" specified as the object to be edited. Furthermore, a GUI (OK button/NG button) for inputting a confirmation result by the user is displayed on the user interface.

In a case where the user agrees to the deletion of the word "airport" specified as the object to be edited, the user performs the touch operation on the OK button on the user interface. In response to the operation, the speech recognition result corresponding processing unit 31 transmits information indicating deletion of the word "airport" specified as the object to be edited to the speech recognition server 14.

In response to the transmission, in the speech recognition server 14, the editing corresponding processing unit 48 deletes the phoneme information associated with the word "airport" from the speech information based on the utterance of the user "I drove your car to airport every day". Therefore, the speech information stored in the speech recognition server 14 is configured by only the phoneme information corresponding to the words other than the word to be edited (hereinafter the phoneme information is appropriately referred to as speech information of non-editing object), as illustrated in FIG. 11.

Note that, for example, the word to be the object to be edited may be specified according to utterance of the user "delete airport and input station", other than the example illustrated in FIG. 11. Furthermore, for example, in a case where a time in which the user stops the line of sight on a word that the user wishes to edit is a predetermined time (for example, three seconds) or more, the word may be specified as the object to be edited. Even in these cases, a user interface similar to the user interface in FIG. 11 is displayed, and the word to be edited can be deleted according to the touch operation of the user on the user interface.

Meanwhile, as illustrated in FIG. 12, in the client terminal 13, the speech recognition result corresponding processing unit 31 causes the video output unit 22 to display the user interface prompting re-utterance. On this user interface, a word string with a blank portion where the word to be edited has been deleted from the speech recognition result is displayed and a message prompting re-utterance for editing the word in the blank portion "Waiting for re-utterance to here" is displayed.

In response to such a user interface, the speech information acquisition unit 21 acquires the speech information of the re-utterance based on the utterance "station" of the user and transmits the speech information to the speech recognition server 14. In the speech recognition server 14, the editing corresponding processing unit 48 performs processing of connecting the speech information "station" of the re-utterance to the portion where the phoneme information associated with the word "airport" in the speech information of non-editing object is deleted to create the speech information for editing speech recognition.

Then, the editing corresponding processing unit 48 supplies the speech information for editing speech recognition to the speech recognition unit 43 to perform speech recognition. As a result, the speech recognition unit 43 acquires the speech recognition result "I drove your car to station every day" and supplies the speech recognition result to the editing corresponding processing unit 48. The editing corresponding processing unit 48 deletes the speech information of non-editing object from the speech recognition result, acquires the word "station" to be the replacement information to be replaced with the word "airport" deleted from the speech recognition result presented to the user, and transmits the replacement information to the client terminal 13.

Figure 13:
FIG. 13 is a diagram for describing display of a speech recognition result reflecting editing.

In response to the transmission, as illustrated in FIG. 13, in the client terminal 13, the speech recognition result corresponding processing unit 31 displays the speech recognition result "I drove your car to station every day" reflecting the editing with the word "station" that is the replacement information. Moreover, the speech recognition result corresponding processing unit 31 displays a user interface "Is this possibly . . . ?" that presents other candidates of the replacement information. On this user interface, a GUI for inputting other candidates (stay and attention) and a GUI (leave it button) instructing determination of the editing with the word "station" that is the replacement information are displayed in addition to the replacement information.

In the case of determining the editing with the word "station" that is the replacement information, the touch operation on the leave it button is performed on the user interface. In response to the operation, the speech recognition result corresponding processing unit 31 can determine the speech recognition result "I drove your car to station every day" reflecting the editing with the word "station" that is the replacement information. Note that the editing with the word "station" that is the replacement information may be determined by a speech (utterance of "leave it") or a line of sight, other than the above operation.

Note that at least one piece of speech information for editing speech recognition is created. For example, a plurality of pieces of the speech information for editing speech recognition may be created in some patterns. Furthermore, one piece of speech information of the re-utterance has been described. However, a plurality of pieces of speech information may be adopted. In this case, pieces of the speech information for editing speech recognition in some patters are created.

For example, to increase the precision of the speech recognition, the editing corresponding processing unit 48 can add specific speech information to before a portion to which the speech information of the re-utterance is connected to create the speech information for editing speech recognition.

Figure 14:
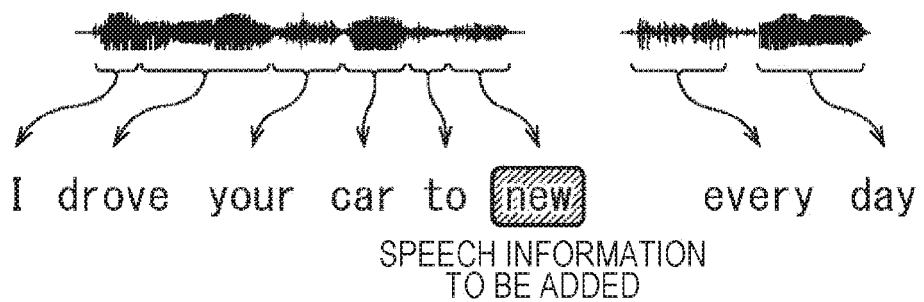
FIG. 14 is a diagram for describing an example of adding specific speech information before a portion to which speech information of re-utterance is connected.

For example, as illustrated in FIG. 14, the editing corresponding processing unit 48 may perform processing of adding speech information "new" to before the portion to which the speech information of the re-utterance is connected, and connecting the speech information "station" of the re-utterance following the speech information "new", thereby creating the speech information for editing speech recognition. For example, since there is a high possibility that a noun enters the deleted portion because the part of speech of the word "airport" recognized in preliminary language processing is a noun, the editing corresponding processing unit 48 adds the speech information "new". Furthermore, the editing corresponding processing unit 48 can add speech information stored when the user uttered in the past, can link and add speech information acquirable via the network 12, and can add speech information created with a synthesized speech (TSS), as the speech information "new".

Then, by adding the speech information "new" to before the portion to which the speech information of the re-utterance is connected, the precision of recognizing the speech information of the re-utterance can be improved when the speech recognition unit 43 performs speech recognition for the speech information for editing speech recognition.

<Speech Information for Editing Speech Recognition Using Sound Information Other Than Utterance>

An example of using sound information other than utterance, as the speech information for editing speech recognition, for performing the speech recognition processing for the speech information of the re-utterance, will be described with reference to FIGS. 15, 16, 17A, and 17B.

Figure 15:
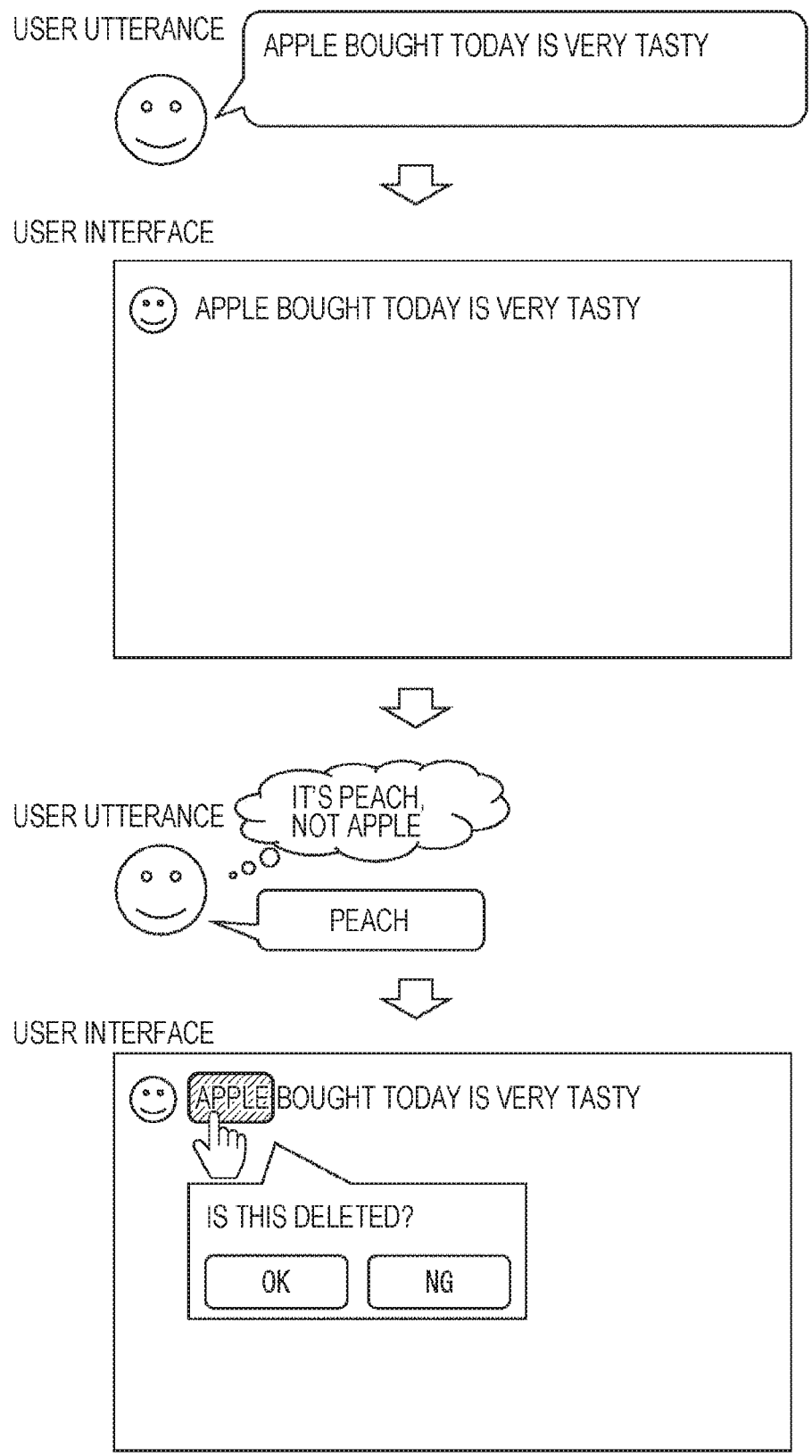
FIG. 15 is a diagram illustrating an example of a user interface for editing a speech recognition result.

As illustrated in FIG. 15, for example, the user utters "The apple bought today is very tasty" to the client terminal 13, and a speech recognition result of the utterance is displayed on the video output unit 22 of the client terminal 13.

In a case where the user wishes to edit the word "apple" displayed on the video output unit 22 to a word "peach" in such a speech recognition result, the user long presses the portion where the word "apple" that the user wishes to edit is displayed. As a result, the speech recognition result corresponding processing unit 31 specifies the word as the object to be edited.

Then, the speech recognition result corresponding processing unit 31 displays a user interface for confirming deletion of the word "Is this deleted?" for the word "apple" specified as the object to be edited. Furthermore, a GUI (OK button/NG button) for inputting a confirmation result by the user is displayed on the user interface.

In a case where the user agrees to the deletion of the word "apple" specified as the object to be deleted with respect to such a user interface, the user performs the touch operation on the OK button and re-utters "peach". In response to the operation, the speech information acquisition unit 21 acquires speech information of re-utterance based on the re-utterance "peach" of the user, and transmits the speech information to the speech recognition server 14.

At this time, as illustrated in FIG. 16, the editing corresponding processing unit 48 generates the speech information for editing speech recognition by reference to a database in which a part of speech and categories are associated with each other and a database in which categories, attachable information, and formats of sentence are associated with one another.

Figures 17A, 17B:
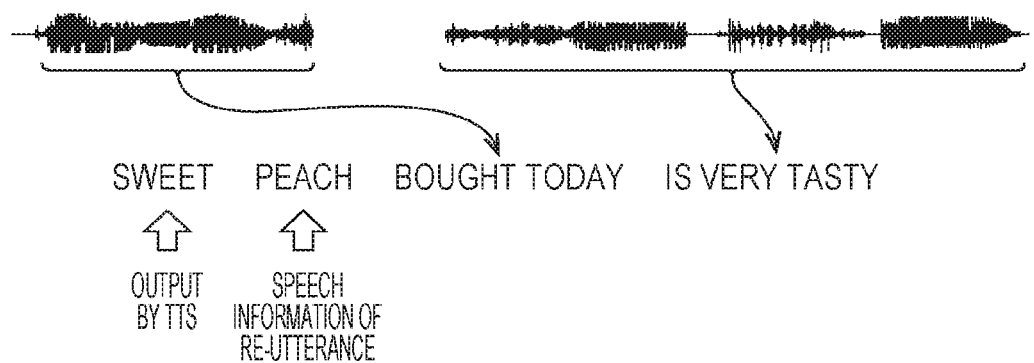
FIGS. 17A and 17B are diagrams for illustrating an example of speech information for editing speech recognition using sound information other than utterance.

Then, in a case where the re-utterance "peach" of the user is associated with a category "fruit name", the editing corresponding processing unit 48 can generate a character string according to attachable information "sweet" to the category "fruit name" as the speech information for editing speech recognition. For example, the editing corresponding processing unit 48 generates a character string "sweet peach bought today is very tasty" as illustrated in FIG. 17A. In such a character string, the speech information uttered by the user is used for "bought today" and "is very tasty", "sweet" is output by synthesized speech (TSS), and the speech information of the re-utterance of the user is used for "peach".

Furthermore, the editing corresponding processing unit 48 can generate a character string according to a format "tasty fruit+is +(target characters)" of a sentence associated with the category "fruit name" of the re-utterance "peach" of the user, as the speech information for editing speech recognition. For example, the editing corresponding processing unit 48 generates a character string of character string character string "tasty fruit is peach", as illustrated in FIG. 17B. In such a character string, "tasty fruit" and "is" are output by synthesized speech (TSS), and the speech information of the re-utterance of the user is used for "peach".

In this manner, the editing corresponding processing unit 48 can generate the speech information for editing speech recognition using the synthesized speech (TSS) as the speech information other than utterance and perform the speech recognition for the speech information of the re-utterance. As a result, for example, the editing corresponding processing unit 48 can increase the precision of the speech recognition as compared with speech recognition for the speech information alone of the re-utterance.

In other words, the speech recognition system 11 can perform the speech recognition for the re-utterance with high precision by connecting the speech information of the re-utterance to the sound information other than the utterance as described above, the synthesized speech representing information attachable to a category, the synthesized speech representing a sentence generated from a format of sentence, or the like.

Moreover, the speech recognition system 11 can be applied to cases of performing various types of editing based on the re-utterance of the user, in addition to the editing of replacing the word on the basis of the re-utterance of the user (editing airport to station), as described above.

For example, as illustrated in FIG. 18, the speech recognition system 11 can edit conjugation of a verb (edit like to liked) or can edit change of a noun (edit cars to car) on the basis of the re-utterance of the user. Furthermore, the speech recognition system 11 can edit a mistake due to similar sound (edit He to She) on the basis of the re-utterance of the user. Furthermore, the speech recognition system 11 can edit recognition failure in units of words and phrases (edit had to would like) on the basis of the re-utterance of the user.

Then, the speech recognition system 11 connects the speech information other than the speech information of the re-utterance to the speech information of the re-utterance by the user, thereby performing the speech recognition for the re-utterance with high precision.

For example, in a case of performing the speech recognition using only the speech information of the re-utterance when editing the mistake due to similar sound (for example, editing He to She), failure of the sound recognition (for example, false recognition as C or See) is expected. To deal with the failure, the speech recognition system 11 connects the speech information of the re-utterance to the sound information other than utterance and performs the speech recognition for the entire speech information, thereby avoiding such failure of the speech recognition.

Note that, as another example of editing the mistake due to similar sound, the speech recognition system 11 can edit the mistake on the basis of the re-utterance of the user when obtaining a speech recognition result "I want to go to a hospital to die" to an utterance of the user "I want to go to a hospital to day" (edit die to day).

By the way, there are some cases where the speech recognition result falls short of expectations no matter how high the precision of the speech recognition technology is. For example, human memory is not perfect, so even if the speech recognition succeeds, a speech recognition result containing a mistake is not a desired result, due to an utterance with the mistake. Furthermore, it is assumed that humans cannot notice the mistake of content even if the speech recognition result containing the mistake is presented.

To deal with the mistake, the speech recognition system 11 collates the result with the action information, the weather information, and the like to estimate the correction portion for the utterance containing the mistake, and presents the correction portion, thereby enabling the user to easily notice the mistake. As a result, the speech recognition system 11 can improve the precision of the speech correction system.

Moreover, when making re-utterance and reflecting editing on a part of a character string obtained as a result of a speech input as the editing portion, the recognition precision becomes low and expected correction cannot be performed if utterance context contained in the original utterance cannot be used even if the speech recognition is performed only for the portion of the re-utterance.

To deal with the above, the speech recognition system 11 connects the speech information other than the speech information of the re-utterance to the speech information of the re-utterance, thereby performing the speech recognition for the re-utterance with high precision, using the utterance context contained in the original utterance.

<Processing in Client Terminal>

Figure 19:
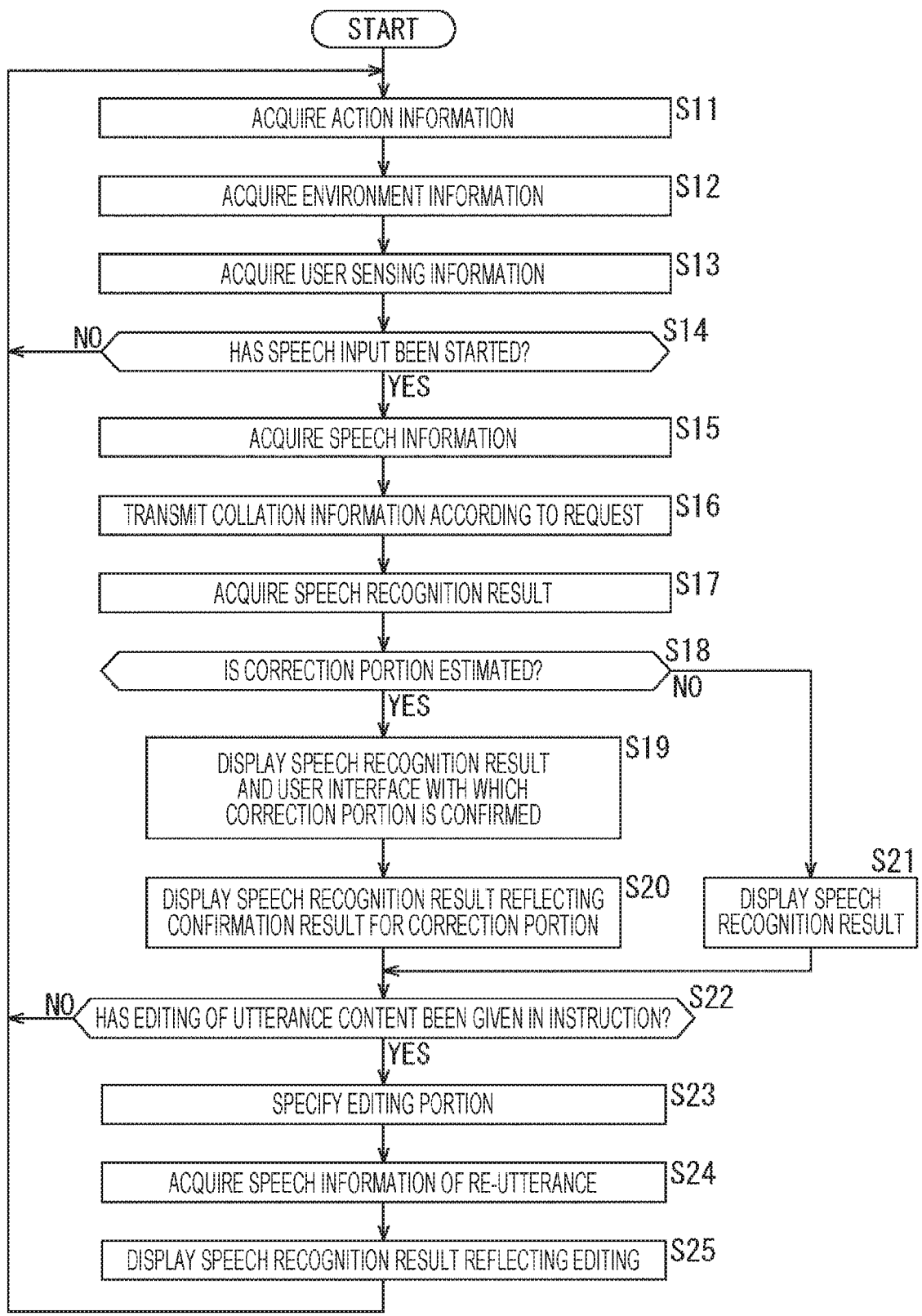
FIG. 19 is a flowchart for describing processing executed in a client terminal.

FIG. 19 is a flowchart for describing processing executed in a client terminal 13.

For example, the client terminal 13 always performs processing in the background even when the user is not inputting speech. In step S11, the action information acquisition unit 25 acquires the action information of the user and records the action information in the recording unit 29.

In step S12, the environment information acquisition unit 26 acquires the environment information indicating the environment around the user and records the environment information in the recording unit 29.

In step S13, the line-of-sight information acquisition unit 27 acquires the line-of-sight information indicating the direction of the line of sight of the user, and the object recognition unit 28 acquires the object recognition information indicating the recognition result of the object visually recognized by the user. Then, the line-of-sight information and the object recognition information are recorded in the recording unit 29 as user sensing information obtained as a result of sensing the user.

In step S14, the speech information acquisition unit 21 determines whether or not speech input by the user has been started. For example, when a specific operation is performed for a button (not illustrated) or when a user utters a specific keyword instructing the start of speech input, the speech information acquisition unit 21 can determine that the speech input by the user has been started.

In step S14, in a case where the speech information acquisition unit 21 determines that the speech input by the user has not been started, the processing returns to step S11 and the above-described processing is repeatedly performed. On the other hand, in step S14, in a case where the speech information acquisition unit 21 determines that the speech input has been started, the processing proceeds to step S15.

In step S15, the speech information acquisition unit 21 acquires the speech information based on the utterance of the user. Then, the speech information acquisition unit 21 supplies the speech information to the communication unit 30, and the communication unit 30 transmits the speech information to the speech recognition server 14 via the network 12.

In step S16, the communication unit 30 transmits the collation information according to the request (for example, step S35 in FIG. 20 as described below) by the collation information acquisition unit 47 of the speech recognition server 14 to the speech recognition server 14 via the network 12. As described above, the action information, the environment information, and the user sensing information are recorded in the recording unit 29, and the communication unit 30 reads information according to the request by the collation information acquisition unit 47 from among the information and transmits the read information to the speech recognition server 14 as the collation information.

In step S17, the communication unit 30 acquires the speech recognition result transmitted from the speech recognition server 14 in step S39 or S39 in FIG. 20 as described below and supplies the speech recognition result to the speech recognition result corresponding processing unit 31. Here, in the case where it has been estimated that there is a correction portion that requires correction for the speech recognition result in the speech recognition server 14, the information for confirming the correction portion is added to the speech recognition result.

In step S18, the speech recognition result corresponding processing unit 31 determines whether or not it has been estimated that there is a correction portion for the speech recognition result on the basis of whether or not the information for confirming the correction portion is added to the speech recognition result.

In step S18, in a case where the speech recognition result corresponding processing unit 31 determines that it has been estimated that there is a correction portion for the speech recognition result, the processing proceeds to step S19.

In step S19, the speech recognition result corresponding processing unit 31 causes the video output unit 22 to display the sentence indicating the speech recognition result and generates the user interface for confirming the correction portion and causes the video output unit 22 to display the user interface. In this user interface, a GUI (button) for accepting confirmation of correction by the user is displayed, as described with reference to FIGS. 4 to 9.

In step S20, the operation input unit 23 supplies, to the speech recognition result corresponding processing unit 31, the operation information indicating the content of the operation input by the touch operation of the user on the GUI for accepting confirmation of correction by the user. Then, the speech recognition result corresponding processing unit 31 causes the video output unit 22 to display the speech recognition result reflecting the confirmation result for the correction portion according to the operation information.

On the other hand, in step S18, in a case where the speech recognition result corresponding processing unit 31 determines that it has not been estimated that there is a correction portion for the speech recognition result, the processing proceeds to step S21, and the speech recognition result corresponding processing unit 31 causes the video output unit 22 to display the sentence indicating the speech recognition result.

After the processing of step S20 or S21, the processing proceeds to step S22, and the speech recognition result corresponding processing unit 31 determines whether or not the user has instructed editing of the uttered content to the speech recognition result displayed on the video output unit 22. For example, as described with reference to FIG. 11, when the user touches and long presses a portion where a word to be edited is displayed in the sentence indicated by the speech recognition result and the operation information corresponding to the touch operation is supplied from the operation input unit 23, the speech recognition result corresponding processing unit 31 can determine that editing of the uttered content has been instructed by the user.

In step S22, in a case where the speech recognition result corresponding processing unit 31 determines that the editing of the uttered content has been instructed by the user, the processing proceeds to step S23.

In step S23, the speech recognition result corresponding processing unit 31 specifies the editing portion based on the operation information, in other words, the word to be the object to be edited. Then, the speech recognition result corresponding processing unit 31 displays the user interface for confirming deletion of the word, as described with reference to FIG. 11. Thereafter, when the user performs the operation of agreeing to the deletion of the word specified as the object to be edited, the speech recognition result corresponding processing unit 31 transmits information indicating the deletion of the word specified as the object to be edited to the speech recognition server 14.

In step S24, the speech recognition result corresponding processing unit 31 causes the video output unit 22 to display the user interface prompting re-utterance, as described with reference to FIG. 12. Then, the speech information acquisition unit 21 acquires the speech information of re-utterance based on the utterance of the user, and transmits the speech information to the speech recognition server 14.

In step S25, the speech recognition result corresponding processing unit 31 acquires the replacement information transmitted from the speech recognition server 14 in step S56 in FIG. 21 as described below via the communication unit 30. Then, the speech recognition result corresponding processing unit 31 replaces the editing portion with the replacement information and causes the video output unit 22 to display the speech recognition result reflecting the editing.

After the processing in step S25 or in a case where it is determined that editing of the uttered content has not been instructed by the user in step S22, the processing returns to step S11, and hereinafter similar processing is repeated performed.

<Processing in Speech Recognition Server>

Figure 20:
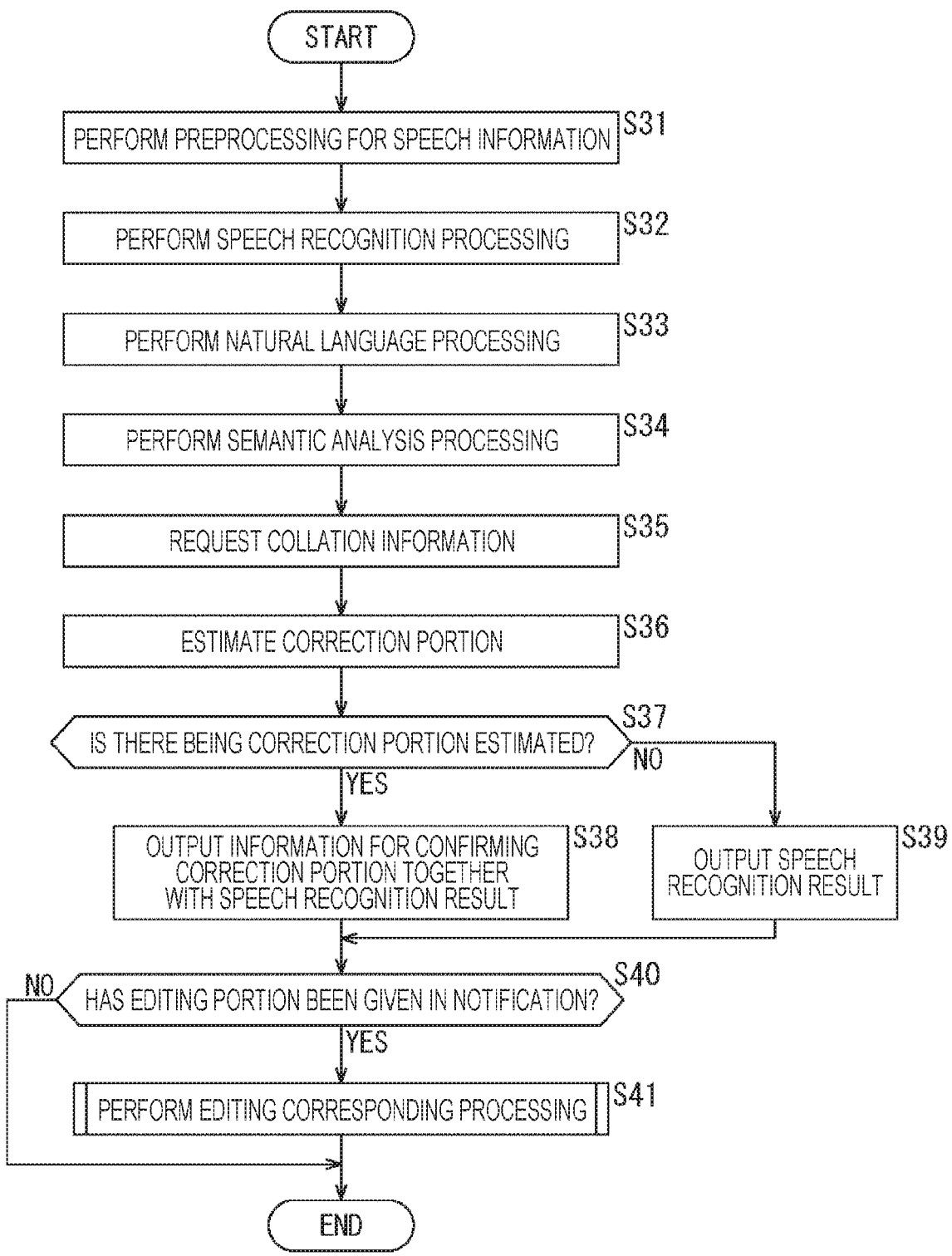
FIG. 20 is a flowchart for describing processing executed in a speech recognition server.
Figure 21:
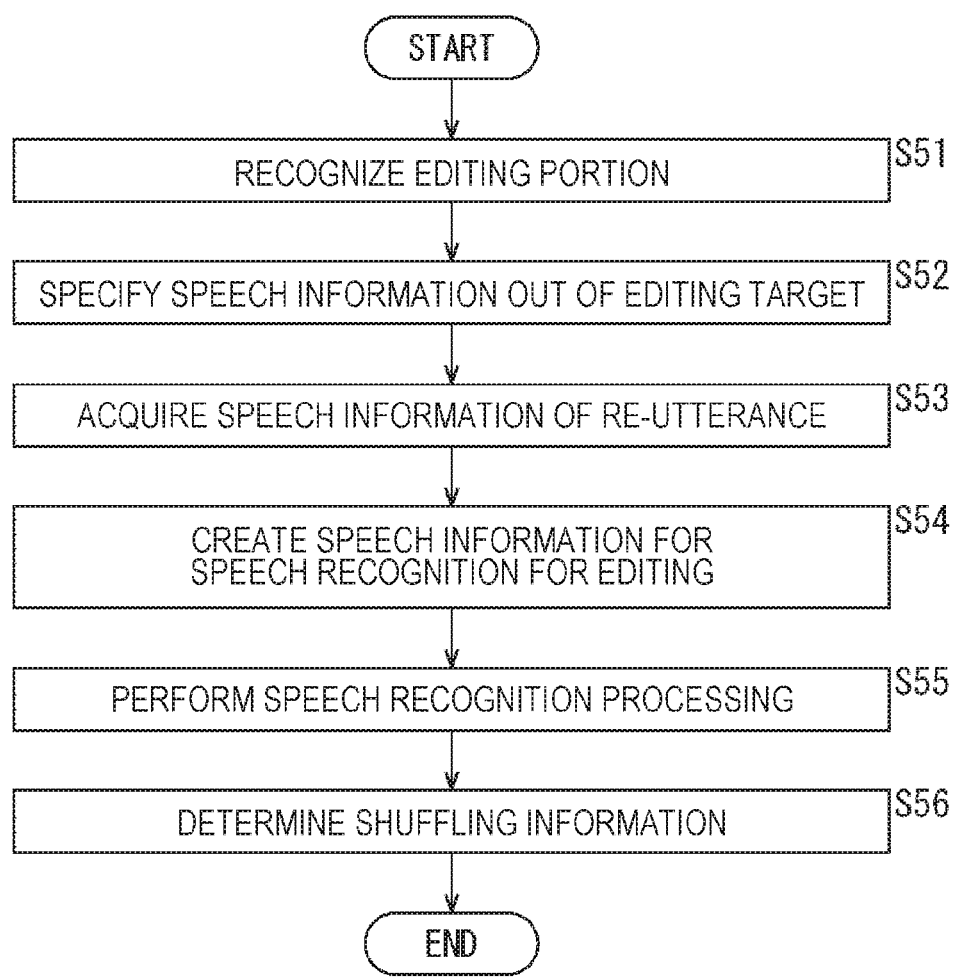
FIG. 21 is a flowchart for describing editing corresponding processing.

FIGS. 20 and 21 are flowcharts for describing processing executed in the speech recognition server 14.

For example, when the communication unit 41 receives the speech information transmitted from the client terminal 13 in step S15 in FIG. 19 and supplies the speech information to the input sound processing unit 42, the processing is started. In step S31, the input sound processing unit 42 performs the preprocessing such as VAD processing for the speech information supplied from the communication unit 41 and supplies the speech information to the speech recognition unit 43.

In step S32, the speech recognition unit 43 performs the speech recognition processing for the speech information supplied from the input sound processing unit 42 in step S31. Then, the speech recognition unit 43 supplies the sentence obtained as the speech recognition result to the natural language processing unit 44.

In step S33, the natural language processing unit 44 performs the natural language processing for the sentence representing the speech recognition result supplied from the speech recognition unit 43 in step S32 and supplies the speech recognition result to which the natural language processing has been applied to the semantic analysis processing unit 45.

In step S34, the semantic analysis processing unit 45 performs the semantic analysis processing of analyzing the meaning of the sentence for the sentence representing the speech recognition result supplied from the natural language processing unit 44 in step S33 and supplies content of the sentence indicated by the speech recognition result to the correction portion estimation processing unit 46.

In step S35, the correction portion estimation processing unit 46 recognizes the collation information necessary for determining the accuracy of the content of the sentence indicated by the speech recognition result supplied from the semantic analysis processing unit 45 in step S34, and the collation information acquisition unit 47 requests the collation information via the communication unit 41. For example, the collation information acquisition unit 47 requests the client terminal 13 to transmit the action information, the environment information, the line-of-sight information, the object recognition information, and the like or requests the news server 15 and the encyclopedia server 16 to transmit the fact information. Then, the collation information acquisition unit 47 acquires the collation information transmitted in response to the request via the communication unit 41 and supplies the collation information to the correction portion estimation processing unit 46.

In step S36, the correction portion estimation processing unit 46 performs processing collating the content of the sentence indicated by the speech recognition result with the collation information acquired in step S35 and estimating a correction portion for the sentence.

In step S37, the correction portion estimation processing unit 46 determines whether or not it has been estimated that there is a correction portion in the sentence indicated by the speech recognition result as a result of the processing in step S35.

In step S37, in a case where the correction portion estimation processing unit 46 determines that there is a correction portion in the sentence indicated by the speech recognition result, the processing proceeds to step S38. In step S38, the correction portion estimation processing unit 46 supplies information indicating the correction portion together with the speech recognition result to the speech recognition result output processing unit 49, and the speech recognition result output processing unit 49 outputs the information for confirming the correction portion together with the speech recognition result.

On the other hand, in step S37, in a case where the correction portion estimation processing unit 46 determines that there is no correction portion in the sentence indicated by the speech recognition result, the processing proceeds to step S39. In step S39, the correction portion estimation processing unit 46 supplies the speech recognition result to the speech recognition result output processing unit 49, and the speech recognition result output processing unit 49 outputs the speech recognition result.

After the processing in step S38 or S39, the processing proceeds to step S40, and the editing corresponding processing unit 48 determines whether or not the editing portion has been notified by the client terminal 13. For example, when the information indicating deletion of the word specified as the object to be deleted is transmitted from the client terminal 13 in step S23 in FIG. 19, the editing corresponding processing unit 48 determines that the editing portion has been notified.

In step S40, in a case where the editing corresponding processing unit 48 determines that the editing portion has been notified, the processing proceeds to step S41 and is terminated after editing corresponding processing is performed. In a case where the editing corresponding processing unit 48 determines that the editing portion has not been notified, the processing is directly terminated.

FIG. 21 is a flowchart for describing the editing corresponding processing performed in step S41 in FIG. 20.

In step S51, the editing corresponding processing unit 48 recognizes the editing portion according to the information indicating deletion of the word specified as the object to be deleted transmitted from the client terminal 13.

In step S52, the editing corresponding processing unit 48 deletes the phoneme information associated with the word of the editing portion recognized in step S51 from the speech information stored in the speech recognition server 14, as described with reference to FIG. 11. As a result, the editing corresponding processing unit 48 specifies the speech information of non-editing object.

In step S53, the editing corresponding processing unit 48 acquires the speech information of the re-utterance transmitted from the client terminal 13 in step S24 of in FIG. 19.

In step S54, the editing corresponding processing unit 48 performs processing of connecting the speech information of the re-utterance acquired in step S53 to the editing portion from which the word has been deleted in the speech information of non-editing object recognized in step S52, thereby creating the speech information for editing speech recognition.

In step S55, the editing corresponding processing unit 48 supplies the speech information for editing speech recognition created in step S54 to the speech recognition unit 43 to perform speech recognition.

In step S56, the editing corresponding processing unit 48 determines the speech information remaining after deleting the speech information of non-editing object, from the speech recognition result obtained by performing the speech recognition in step S55, as the replacement information to be replaced with the editing portion. Then, the editing corresponding processing unit 48 transmits the replacement information to the client terminal 13 via the communication unit 41. In response to the transmission, after editing is reflected by replacing the editing portion of the speech recognition result with the replacement information in step S25 in FIG. 19, the editing corresponding processing is terminated.

As described above, the client terminal 13 and the speech recognition server 14 can display the user interface for confirming the correction portion estimated on the basis of the action information of the user, the weather information, and the like, together with the speech recognition result for the speech information based on the utterance of the user. With the display, an incorrect speech input due to slip of memory of the user or the like can be easily corrected, for example.

Furthermore, the client terminal 13 and the speech recognition server 14 can perform the speech recognition for the speech information for editing speech recognition in which the speech information of the re-utterance of the editing portion instructed by the user is connected to the speech information of non-editing object. Therefore, the speech recognition server 14 can further improve the precision of the speech recognition than a configuration that performs the speech recognition using only the speech information of re-utterance, for example.

As described above, the speech recognition system 11 can estimate the correction portion with more accuracy and present the correction portion to the user, and can perform the speech recognition for the editing portion with high precision. As a result, the speech recognition system 11 can provide a more convenient speech recognition service.

Therefore, the speech recognition service provided by the speech recognition system 11 can be used in applications in general that provides a user interface for inputting speech, for example. For example, by using a speech recognition service provided by the speech recognition system 11 in a virtual agent system or the like, a lie can be estimated as the correction portion in a case where an utterance of a user contains the lie, and the user can be prompted to correct the correction portion.

For example, when the user utters "Today is cold", the speech recognition system 11 collates the utterance with the environment information indicating temperature acquired by the environment information acquisition unit 26 and can estimate the word "cold" of the speech recognition result as the correction portion in a case where the temperature at that time is 38 degrees.

Note that, in the present embodiment, the speech recognition system 11 is configured by the client terminal 13 and the speech recognition server 14 connected via the network 12, and provides the speech recognition server as described with reference to FIG. 1. However, the embodiment is not limited to this configuration, and for example, the client terminal 13 alone may configure a speech recognition system and provide a speech recognition service without performing communication via the network 12.

Furthermore, the blocks constituting the client terminal 13 and the speech recognition server 14 may be arranged on either side of the network 12 as long as the blocks can provide the speech recognition service as the speech recognition system 11 on the whole.

Note that the processing described with reference to the flowcharts need not necessarily be chronologically processed according to the order described as the flowcharts and includes processing executed in parallel or individually (for example, parallel processing and processing by object) Furthermore, the program may be processed by a single CPU or may be processed in a distributed manner by a plurality of CPUs.

Furthermore, the above-described series of processing (information processing method) can be executed by hardware or software. In the case of executing the series of processing by software, a program constituting the software is installed from a program recording medium on which the program is recorded to a computer incorporated in dedicated hardware, or for example, a general-purpose computer capable of executing various functions by being installed various programs, or the like.

FIG. 22 is a block diagram illustrating a configuration example of hardware of a computer that executes the above-described series of processing by a program.

In the computer, a central processing unit (CPU) 101, a read only memory (ROM) 102, and a random access memory (RAM) 103 are mutually connected by a bus 104.

Moreover, an input/output interface 105 is connected to the bus 104. An input unit 106 including a keyboard, a mouse, a microphone, and the like, an output unit 107 including a display, a speaker, and the like, a storage unit 108 including a hard disk, a non-volatile memory, and the like, a communication unit 109 including a network interface and the like, and a drive 110 for driving a removable medium 111 such as a magnetic disk, an optical disk, a magneto-optical disk, or a semiconductor memory are connected to the input/output interface 105.

In the computer configured as described above, the CPU 101 loads a program stored in the storage unit 108 into the RAM 103 and executes the program via the input/output interface 105 and the bus 104, whereby the above-described series of processing is performed, for example.

The program executed by the computer (CPU 101) is provided by, for example, being recorded on the removable medium 111 that is a package medium including a magnetic disk (including a flexible disk), an optical disk (a compact disc-read only memory (CD-ROM), a digital versatile disc (DVD), or the like), or via a wired or wireless transmission medium such as a local area network, the Internet, or digital satellite broadcasting.

Then, the program can be installed to the storage unit 108 via the input/output user interface 105 by attaching the removal medium 111 to the drive 110. Furthermore, the program can be received by the communication unit 109 via a wired or wireless transmission medium and installed in the storage unit 108. Other than the above method, the program can be installed in the ROM 102 or the storage unit 108 in advance.

Note that the present technology can also have the following configurations.

(1)

An information processing apparatus including:

a speech recognition unit configured to perform speech recognition for speech information based on an utterance of a user;

a correction portion estimation unit configured to collate content of a sentence obtained as a speech recognition result by the speech recognition unit with collation information necessary for determining accuracy of the content to estimate, for the sentence, a correction portion that requires correction; and a presenting unit configured to present, to the user, the sentence obtained as the speech recognition result together with the correction portion estimated by the correction portion estimation unit.

(2)

The information processing apparatus according to (1), further including:

a collation information acquisition unit configured to acquire the collation information required by the correction portion estimation unit and supplies the collation information to the correction portion estimation unit.

(3)

The information processing apparatus according to (2), in which the collation information acquisition unit acquires fact information provided via a network as the collation information, and the correction portion estimation unit collates the content of the sentence with the fact information to estimate the correction portion.

(4)

The information processing apparatus according to (2) or (3), in which the collation information acquisition unit acquires action information acquired with an action of the user as the collation information, and the correction portion estimation unit collates the content of the sentence with the action information to estimate the correction portion.

(5)

The information processing apparatus according to any one of (2) to (4), in which the collation information acquisition unit acquires environment information indicating an environment around the user as the collation information, and the correction portion estimation unit collates the content of the sentence with the environment information to estimate the correction portion.

(6)

The information processing apparatus according to any one of (2) to (5), in which the collation information acquisition unit acquires object recognition information obtained by recognizing an object located ahead of a line of sight of the user as the collation information, and the correction portion estimation unit collates the content of the sentence with the object recognition information to estimate the correction portion.

(7)

The information processing apparatus according to any one of (1) to (6), further including:

a corresponding processing unit configured to perform processing corresponding to an instruction of the user with respect to presentation of the correction portion.

(8)

An information processing method including the steps of:

performing speech recognition for speech information based on an utterance of a user;

collating content of a sentence obtained as a speech recognition result with collation information necessary for determining accuracy of the content to estimate, for the sentence, a correction portion that requires correction; and presenting, to the user, the sentence obtained as the speech recognition result together with the estimated correction portion.

(9)

A program for causing a computer to execute information processing including steps of:

performing speech recognition for speech information based on an utterance of a user;

collating content of a sentence obtained as a speech recognition result with collation information necessary for determining accuracy of the content to estimate, for the sentence, a correction portion that requires correction; and presenting, to the user, the sentence obtained as the speech recognition result together with the estimated correction portion.

Note that the present embodiments are not limited to the above-described embodiments, and various modifications can be made without departing from the gist of the present disclosure.

REFERENCE SIGNS LIST

11 Speech recognition system
12 Network
13 Client terminal
14 Speech recognition server
15 News server
16 Encyclopedia server
21 Speech information acquisition unit
22 Video output unit
23 Operation input unit
24 Speech output unit
25 Action information acquisition unit
26 Environment information acquisition section
27 Line-of-sight information acquisition unit
28 Object recognition unit
29 Recording unit
30 Communication unit
31 Speech recognition result corresponding processing unit
41 Communication unit
42 Input sound processing unit
43 Speech recognition unit
44 Natural language processing unit
45 Semantic analysis processing unit
46 Correction portion estimation processing unit
47 Collation information acquisition unit
48 Editing corresponding processing unit
49 Speech recognition result output processing unit

The invention claimed is:

1. An information processing apparatus, comprising:
circuitry configured to:
perform a speech recognition process for speech information based on an utterance of a user;

obtain, as a speech recognition result, a sentence based on the speech recognition process;

acquire, as collation information, environment information that indicates an environment around the user, wherein the environment information includes at least one of a temperature associated with the environment or a humidity associated with the environment;

collate a content of the sentence with the environment information;

estimate, for the sentence, a correction portion based on the collation of the content of the sentence with the environment information, wherein the correction portion corresponds to a portion of the sentence that requires a correction; and present, to the user, the sentence and the correction portion.

2. The information processing apparatus according to claim 1, wherein the circuitry is further configured to acquire the collation information from a device associated with user.

3. The information processing apparatus according to claim 2, wherein the circuitry is further configured to:

acquire fact information via a network as the collation information;

collate the content of the sentence with the fact information; and estimate the correction portion based on the collation of the content of the sentence with the fact information.

4. The information processing apparatus according to claim 2, wherein the circuitry is further configured to:

acquire, as the collation information, action information corresponding to an action of the user;

collate the content of the sentence with the action information; and estimate the correction portion based on the collation of the content of the sentence with the action information.

5. The information processing apparatus according to claim 2, wherein the circuitry is further configured to:

recognize an object that is ahead of a line of sight of the user;

acquire, as the collation information, object recognition information based on the recognized object;

collate the content of the sentence with the object recognition information; and estimate the correction portion based on the collation of the content of the sentence with the object recognition information.

6. The information processing apparatus according to claim 1, wherein the circuitry is further configured to perform a process corresponding to an instruction of the user with respect to the presentation of the correction portion.

7. An information processing method, comprising:

performing a speech recognition process for speech information based on an utterance of a user;

obtaining, as a speech recognition result, a sentence based on the speech recognition process;

acquiring, as collation information, environment information indicating an environment around the user, wherein the environment information includes at least one of a temperature associated with the environment or a humidity associated with the environment;

collating a content of the sentence with the environment information;

estimating, for the sentence, a correction portion based on the collation of the content of the sentence with the environment information, wherein the correction portion corresponds to a portion of the sentence that requires a correction; and presenting, to the user, the sentence and the estimated correction portion.

8. A non-transitory computer-readable medium having stored thereon computer-executable instructions which, when executed by circuitry of an information processing apparatus, cause the circuitry to execute operations, the operations comprising:

performing a speech recognition process for speech information based on an utterance of a user;

obtaining, as a speech recognition result, a sentence based on the speech recognition process;

acquiring, as collation information, environment information indicating an environment around the user, wherein the environment information includes at least one of a temperature associated with the environment or a humidity associated with the environment;

collating a content of the sentence with the environment information;

estimating, for the sentence, a correction portion based on the collation of the content of the sentence with the environment information, wherein the correction portion corresponds to a portion of the sentence that requires a correction; and presenting, to the user, the sentence and the estimated correction portion.

* * * * *